(12) United States Patent
Wang et al.

(10) Patent No.: US 10,979,651 B2
(45) Date of Patent: Apr. 13, 2021

(54) IMAGING SYSTEM

(71) Applicant: SZ DJI TECHNOLOGY CO., LTD., Shenzhen (CN)

(72) Inventors: Mingyu Wang, Shenzhen (CN); Zisheng Cao, Shenzhen (CN); Fang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/558,965

(22) Filed: Sep. 3, 2019

(65) Prior Publication Data
US 2020/0007789 A1   Jan. 2, 2020

Related U.S. Application Data

(60) Division of application No. 15/615,705, filed on Jun. 6, 2017, now Pat. No. 10,419,690, which is a
(Continued)

(51) Int. Cl.
*H04N 5/247* (2006.01)
*H04N 5/232* (2006.01)
(Continued)

(52) U.S. Cl.
CPC ........... *H04N 5/247* (2013.01); *B64C 39/024* (2013.01); *H04N 5/2257* (2013.01);
(Continued)

(58) Field of Classification Search
CPC ...... H04N 5/247; H04N 5/2257; H04N 5/265; H04N 5/45; H04N 5/23296; H04N 5/23293; B64C 39/024; B64C 2201/127
See application file for complete search history.

(56) References Cited

U.S. PATENT DOCUMENTS

| 7,253,843 | B2 | 8/2007 | Lee |
| 7,561,191 | B2 | 7/2009 | May et al. |

(Continued)

FOREIGN PATENT DOCUMENTS

| CN | 2872393 Y | 2/2007 |
| CN | 101854487 A | 10/2010 |

(Continued)

OTHER PUBLICATIONS

The World Intellectual Property Organization (WIPO) International Search Report and Written Opinion for PCT/CN2015/076998 dated Jan. 27, 2016.

(Continued)

*Primary Examiner* — Jared Walker
(74) *Attorney, Agent, or Firm* — Anova Law Group, PLLC

(57) ABSTRACT

An imaging system includes a first optical module including a first image sensor, a second optical module comprising a second image sensor, and an image processor. The first optical module has a first focal length range. The second optical module has a second focal length range. The first focal length range and the second focal length range are different. The image processor is configured to receive image data for a first image from the first optical module and/or image data for a second image from the second optical module and generate data to show the first image and/or the second image within a display.

16 Claims, 13 Drawing Sheets

Related U.S. Application Data continuation of application No. PCT/CN2015/076998, filed on Apr. 20, 2015.

(51) Int. Cl.
    *B64C 39/02*     (2006.01)
    *H04N 5/225*     (2006.01)
    *H04N 5/265*     (2006.01)
    *H04N 5/45*     (2011.01)

(52) U.S. Cl.
    CPC ..... *H04N 5/23293* (2013.01); *H04N 5/23296* (2013.01); *H04N 5/265* (2013.01); *H04N 5/45* (2013.01); *B64C 2201/127* (2013.01)

(56) References Cited

U.S. PATENT DOCUMENTS

| | | | |
|---|---|---|---|
| 8,553,106 B2 | 10/2013 | Scarff | |
| 8,599,244 B2 | 12/2013 | Hirooka et al. | |
| 8,687,062 B1 | 4/2014 | Reece | |
| 2004/0080660 A1* | 4/2004 | Battles | H04N 5/23212 348/345 |
| 2004/0130635 A1 | 7/2004 | Kasai | |
| 2006/0187311 A1 | 8/2006 | Labaziewicz et al. | |
| 2006/0187322 A1 | 8/2006 | Janson, Jr. et al. | |
| 2009/0141966 A1* | 6/2009 | Chen | H04N 5/23293 382/154 |
| 2010/0295855 A1* | 11/2010 | Sasakawa | H04N 5/247 345/427 |
| 2011/0301784 A1 | 12/2011 | Oakley et al. | |
| 2012/0120069 A1* | 5/2012 | Kodaira | G06F 16/70 345/419 |
| 2012/0154442 A1 | 6/2012 | Takaoka et al. | |
| 2013/0091191 A1 | 4/2013 | Levin et al. | |
| 2013/0169529 A1 | 7/2013 | Ek | |
| 2013/0278980 A1 | 10/2013 | Janssen et al. | |
| 2016/0125267 A1* | 5/2016 | Goldman | G06T 5/002 348/47 |

FOREIGN PATENT DOCUMENTS

| | | |
|---|---|---|
| CN | 202019412 U | 10/2011 |
| CN | 102809806 A | 12/2012 |
| CN | 102809969 A | 12/2012 |
| CN | 103235602 A | 8/2013 |
| CN | 103795921 A | 5/2014 |
| GB | 2455374 A | 6/2009 |
| JP | 2003298919 A | 10/2003 |
| JP | 2004207774 A | 7/2004 |
| JP | 2005265699 A | 9/2005 |
| JP | 2005269413 A | 9/2005 |
| JP | 2006027448 A | 2/2006 |
| JP | 2006238325 A | 9/2006 |
| JP | 2007081473 A | 3/2007 |
| JP | 2012083685 A | 4/2012 |
| JP | 2013013050 A | 1/2013 |
| JP | 2014062789 A | 4/2014 |
| WO | 2009153588 A1 | 12/2009 |
| WO | 2014120331 A2 | 8/2014 |

OTHER PUBLICATIONS

The European Patent Office (EPO) European Search Report with Written Opinion for EP15871311 dated May 12, 2017.

* cited by examiner

IMAGING SYSTEM

CROSS-REFERENCE

This application is a division of application Ser. No. 15/615,705, filed on Jun. 6, 2017, which is a continuation of International Application No. PCT/CN2015/076998, filed on Apr. 20, 2015, which are incorporated herein by reference in their entirety.

BACKGROUND

Aerial vehicles, such as unmanned aerial vehicles (UAVs), have been developed for a wide range of applications including surveillance, search and rescue operations, exploration, and other fields. Such UAVs can carry onboard cameras to capture still images and video images.

In order to capture high quality images, a high performance zoom lens camera module may be carried onboard the UAV. However, camera modules having a zoom lens that cover a wide zoom range may be large in size, heavy in weight and expensive in cost.

SUMMARY

Systems and methods are provided for capturing and displaying multiple images by using multiple optical modules. It may be desirable to capture images of an environment far away from the optical modules. A camera may be provided that permits optical zoom of an image. In some instances, the camera may be carried on board a movable object, such as a UAV, and may optionally be stabilized using a carrier. The carrier may be a gimbal that permits movement of the camera relative to the UAV. In traditional system, a zoom lens camera may be provided, which may extend and retract a lens in order to switch between focusing an image close to a camera and focusing the image far away from the camera. In this case, the gravity center of the zoom lens camera module may significantly change due to movement of the lens, resulting in improper function of the gimbal and/or UAV. Accordingly, in order to properly maintain a stability of the gimbal and UAV while permitting a wide range of optical zoom, a need exists for an imaging system that can achieve a large zoom ratio with simple configuration and small size.

In some embodiments, an imaging system may have two or more optical modules. A first optical module and a second optical module having different field of view (FOV) angular ranges or different focal length ranges may be juxtaposed and aligned to capture images from the same direction. An image processor may receive the image data from the first and second optical modules and generate data to show images captured using the first and second optical modules within a display. The captured images may be shown within a display simultaneously or separately. In some embodiments, at least one of the first and second optical modules may comprise a prime lens or a zoom lens. The FOVs or the focal length ranges of the first and second optical modules may or may not overlap.

The method of displaying multiple images of present disclosure may comprise capturing a first image and a second image at a first optical module and a second optical module, respectively; receiving the first and second images; and generating data to show images captured using the first and second optical modules simultaneously within a display. The FOVs or focal length ranges of the first and second optical modules may be selected to provide a zoom ratio higher than either of the two optical modules. A Picture-In-Picture (PIP) function may be implemented.

The present disclosure also provides an unmanned aerial vehicle (UAV) carrying the imaging system having two or more optical modules. In some embodiments, a first optical module and a second optical module may be carried on a gimbal onboard the UAV, such that the first and second optical modules may move or rotate relative to a body of the UAV.

An aspect of the disclosure may include an imaging system, comprising: a first optical module comprising a first image sensor, said first optical module having a first field of view angular range; a second optical module comprising a second image sensor, said second optical module having a second field of view angular range, wherein the first field of view angular range and the second field of view angular range are different; and an image processor configured to receive image data for the first image from the first optical module and/or image data for the second image from the second optical module and generate data to show the first image and/or the second image captured using the first optical module and/or the second optical module within a display.

In some embodiments, the image processor may be configured to generate data to show one of the first image and the second image captured using the first optical module and the second optical module within the display. Alternatively, the image processor may be configured to generate data to show both the first image and the second image captured using the first optical module and the second optical module within the display.

In some embodiments, the first optical module and the second optical module may be aligned to capture images from the same direction. In some instances, the optical axes of the first optical module and the second optical module may be in parallel. In some embodiments, the first optical module and the second optical module may share a housing.

In some embodiments, the first optical module may comprise a first lens configured to direct light to the first image sensor and the second optical module may comprise a second lens configured to direct light to the second image sensor. In some instances, at least one of the first optical module and the second optical module may be configured to optically zoom. Optionally, the first optical module and the second optical module may be configured to digitally zoom. Optionally, the first optical module and the second optical module are configured to digitally zoom. In instances, at least one of the first lens or the second lens may be a prime lens. Optionally, at least one of the first lens or the second lens may be a zoom lens.

In some embodiments, the first field of view angular range or the second field of view angular range may encompass a plurality of field of view angles. Alternatively, the first field of view angular range or the second field of view angular range may encompass a single field of view angle. In some embodiments, the first field of view angular range and the second field of view angular range may not be centered on a same point and may overlap. Alternatively, the first field of view angular range and the second field of view angular range may not be centered on a same point and may not overlap. In some embodiments, the first field of view angular range and the second field of view angular range may be centered on a same point and may overlap. Alternatively, the first field of view angular range and the second field of view angular range may be centered on a same point and may not overlap.

In some embodiments, the first image sensor and second image sensor may have the same size. In some embodiments, the display may be a local display of the imaging system and may be connected to the image processor. Alternatively, the display may be remote to the imaging system.

In some embodiments, the first field of view angular range may encompass a wider field of view angle than a second field of view angular range.

In some embodiments, the images may be displayed such that a second image captured by the second optical module having a narrower field of view is displayed within the first image captured by the first optical module having a wider field of view. In some instances, the second image may be centered on a point selected by a user within the first image. The second optical module may rotate to center the second image on the point selected by the user, or a carrier on which the first and second optical modules are carried may rotate to center the second image on the point selected by the user. In some instances, a zoom ratio may be considered in determining the second image that is displayed. In some instances, a size of the second image displayed within the first image may be selected by a user. In some embodiments, a portion of the first image may be displayed. The displayed portion of the first image may be selected by a user. Alternatively or additionally, a portion of the second image may be displayed. The displayed portion of the second image may be selected by a user.

Alternatively, the images may be displayed such that a second image captured by the second optical module having a narrower field of view is displayed within a third image obtained from combining the second image and the first image captured by the first optical module having a wider field of view. In some instances, the second image and first image may be combined by an interpolation algorithm to obtain the third image. For instance, the interpolation algorithm may be a cubic interpolation or a bilinear interpolation. In some instances, the second image may be centered on a point selected by a user within the first image. The second optical module or a carrier on which the first and second optical modules are carried may rotate to center the second image on the point selected by the user. In some instances, a size of the second image displayed within the third image may be selected by a user.

Alternatively, one of a first image captured by the first optical module having a narrower field of view and a second image captured by the second optical module having a wider field of view may be displayed on the display. In some instances, a portion of the one of the first image and the second image may be displayed on the display. The displayed portion of the one of the first image and the second image may be selected by a user. In some instances, the first field of view angular range and the second field of view angular range may overlap. A displaying of the first image may be switched to a displaying of the second image by soft switching. Optionally, the first field of view angular range and the second field of view angular range may not overlap. A displaying of the first image may be switched to a displaying of the second image by an interpolation algorithm. The interpolation algorithm may be a cubic interpolation or a bilinear interpolation.

Aspects of the disclosure may further include an unmanned aerial vehicle (UAV) comprising one or more propulsion units configured to effect movement of the UAV; and the imaging system of any one of above aspects of the disclosure.

Aspects of the disclosure may further include a method of displaying multiple images, said method comprising: capturing, at a first optical module comprising a first image sensor, a first image, wherein said first optical module has a first field of view angular range; capturing, at a second optical module comprising a second image sensor, a second image, wherein said second optical module has a second field of view angular range, wherein the first field of view angular range and the second field of view angular range are different; receiving image data for the first image from the first optical module and/or image data for the second image from the second optical module; and generating data to show the first image and/or the second image within a display.

In some embodiments, generating data to show the first image and/or the second image within a display may include generating data to show one of the first image and the second image within the display. Alternatively, generating data to show the first image and/or the second image within a display may include generating data to show both the first image and the second image within the display.

In some embodiments, the first optical module and the second optical module may be aligned to capture images from the same direction. In some instances, the optical axes of the first optical module and the second optical module may be in parallel. In some instances, the first optical module and the second optical module may share a housing.

In some embodiments, the first optical module may comprise a first lens configured to direct light to the first image sensor and the second optical module may comprise a second lens configured to direct light to the second image sensor. In some instances, at least one of the first optical module and the second optical module may be configured to optically zoom. Optionally, the first optical module and the second optical module may be configured to digitally zoom. In some instances, at least one of the first lens or the second lens may be a prime lens. Optionally, at least one of the first lens or the second lens may be a zoom lens.

In some embodiments, the first field of view angular range or the second field of view angular range may encompass a plurality of field of view angles. Alternatively, the first field of view angular range or the second field of view angular range may encompass a single field of view angle. In some instances, the first field of view angular range and the second field of view angular range may not be centered on a same point and may overlap. Optionally, the first field of view angular range and the second field of view angular range may not be centered on a same point and may not overlap. In some instances, the first field of view angular range and the second field of view angular range may be centered on a same point and may overlap. Optionally, the first field of view angular range and the second field of view angular range may be centered on a same point and may not overlap.

In some embodiments, the first image sensor and second image sensor may have the same size. In some instances, the display may be a local display. Optionally, the display may be a remote display.

In some embodiments, the first field of view angular range may encompass a wider field of view angle than a second field of view angular range.

In some embodiments, the images may be displayed such that a second image captured by the second optical module having a narrower field of view is displayed within the first image captured by the first optical module having a wider field of view. In some instances, the second image may be centered on a point selected by a user within the first image. The method may further comprising rotating the second optical module to center the second image on the point selected by the user, or rotating a carrier on which the first and second optical modules are carried to center the second image on the point selected by the user. In some instances, a zoom ratio may be considered in determining the second image that is displayed. In some instances, a size of the second image displayed within the first image may be selected by a user. In some instances, a portion of the first image may be displayed. The displayed portion of the first image may be selected by a user. Alternatively or additionally, a portion of the second image may be displayed. The displayed portion of the second image may be selected by a user.

Alternatively, the images may be displayed such that a second image captured by the second optical module having a narrower field of view is displayed within a third image obtained from combining the second image and the first image captured by the first optical module having a wider field of view. In some instances, the second image and first image may be combined by an interpolation algorithm to obtain the third image. The interpolation algorithm may be a cubic interpolation or a bilinear interpolation. In some instances, the second image may be centered on a point selected by a user within the first image. The method may further comprise rotating the second optical module or rotating a carrier on which the first and second optical modules are carried to center the second image on the point selected by the user. In some instances, a size of the second image displayed within the third image may be selected by a user.

Alternatively, one of a first image captured by the first optical module having a wider field of view and a second image captured by the second optical module having a narrower field of view may be displayed on the display. In some instances, a portion of the one of the first image and the second image may be displayed on the display. The displayed portion of the one of the first image and the second image may be selected by a user. In some instances, the first field of view angular range and the second field of view angular range may overlap. A displaying of the first image may be switched to a displaying of the second image by soft switching. Optionally, the first field of view angular range and the second field of view angular range may not overlap. A displaying of the first image may be switched to a displaying of the second image by an interpolation algorithm. The interpolation algorithm is a cubic interpolation or a bilinear interpolation.

Aspects of the disclosure may further include an imaging system, comprising: a first optical module comprising a first image sensor, said first optical module having a first focal length range; a second optical module comprising a second image sensor, said second optical module having a second focal length range, wherein the first focal length range and the second focal length range are different; and an image processor configured to receive image data for the first image from the first optical module and/or image data for the second image from the second optical module and generate data to show the first image and/or the second image captured using the first optical module and/or the second optical module within a display.

In some embodiments, the image processor may be configured to generate data to show one of the first image and the second image captured using the first optical module and the second optical module within the display. Alternatively, the image processor may be configured to generate data to show both the first image and the second image captured using the first optical module and the second optical module within the display.

In some embodiments, the first optical module and the second optical module may be aligned to capture images from the same direction. In some instances, the optical axes of the first optical module and the second optical module may be in parallel. In some instances, the first optical module and the second optical module may share a housing.

In some embodiments, the first optical module may comprise a first lens configured to direct light to the first image sensor and the second optical module may comprise a second lens configured to direct light to the second image sensor. In some instances, at least one of the first optical module and the second optical module may be configured to optically zoom. Optionally, the first optical module and the second optical module may be configured to digitally zoom. In some instances, at least one of the first lens or the second lens may be a prime lens. Optionally, at least one of the first lens or the second lens may be a zoom lens.

In some embodiments, the first focal length range or the second focal length range may encompass a plurality of focal lengths. Alternatively, the first focal length range or the second focal length range may encompass a single focal length. In some instances, the first focal length range and the second focal length range may overlap. Optionally, the first focal length range and the second focal length range may not overlap. In some instances, a first image captured by the first optical module and a second image captured by the second optical module may not be centered on a same point. Optionally, a first image captured by the first optical module and a second image captured by the second optical module may be centered on a same point. In some instances, the first image sensor and second may have same size. In some instances, the display may be a local display of the imaging system and may be connected to the image processor. Optionally, the display may be remote to the imaging system.

In some embodiments, the second focal length range may encompass a larger focal length range than the first focal length range.

In some embodiments, the images may be displayed such that a second image captured by the second optical module having a larger focal length range is displayed within a first image captured by the first optical module having a smaller focal length range. In some instances, the second image may be centered on a point selected by a user within the first image. The second optical module or a carrier on which the first and second optical modules are carried may rotate to center the second image on the point selected by the user. In some instances, a zoom ratio may be considered in determining the second image that is displayed. In some instances, a size of the second image displayed within the first image may be selected by a user. In some embodiments, a portion of the first image may be displayed. The displayed portion of the first image may be selected by a user. Alternatively or additionally, a portion of the second image may be displayed. The displayed portion of the second image may be selected by a user.

Alternatively, the images may be displayed such that a second image captured by the second optical module having a larger focal length range is displayed within a third image obtained from combining the second image and the first image captured by the first optical module having a smaller focal length range. In some instances, the second image and first image may be combined by an interpolation algorithm to obtain the third image. The interpolation algorithm may be a cubic interpolation or a bilinear interpolation. In some instances, the second image may be centered on a point selected by a user within the first image. The second optical module or a carrier on which the first and second optical modules are carried may rotate to center the second image on the point selected by the user. In some instances, a size of the second image displayed within the third image may be selected by a user.

Alternatively, one of a first image captured by the first optical module having a smaller focal length range and a second image captured by the second optical module having a larger focal length range may be displayed on the display. In some instances, a portion of the one of the first image and the second image may be displayed on the display. The displayed portion of the one of the first image and the second image may be selected by a user. In some embodiments, the first focal length range and the second focal length range may overlap. A displaying of the first image may be switched to a displaying of the second image by soft switching. Alternatively, the first focal length range and the second focal length range may not overlap. A displaying of the first image maybe switched to a displaying of the second image by an interpolation algorithm, such as a cubic interpolation or a bilinear interpolation.

Aspects of the disclosure may further include an unmanned aerial vehicle (UAV) comprising one or more propulsion units configured to effect movement of the UAV; and the imaging system of any one of above aspects of the disclosure.

Aspects of the disclosure may further include a method of displaying multiple images, said method comprising: capturing, at a first optical module comprising a first image sensor, a first image, wherein said first optical module has a first focal length range; capturing, at a second optical module comprising a second image sensor, a second image, wherein said second optical module has a second focal length range, wherein the first focal length range and the second focal length range are different; receiving image data for the first image from the first optical module and/or image data for the second image from the second optical module; and generating data to show the first image and/or the second image within a display.

In some embodiments, generating data to show the first image and/or the second image within a display may include generating data to show one of the first image and the second image captured using the first optical module and the second optical module within the display. Alternatively, generating data to show the first image and/or the second image within a display includes generating data to show both the first image and the second image captured using the first optical module and the second optical module within the display.

In some embodiments, the first optical module and the second optical module may be aligned to capture images from the same direction. In some instances, the optical axes of the first optical module and the second optical module may be in parallel. In some instances, the first optical module and the second optical module may share a housing.

In some embodiments, the first optical module may comprise a first lens configured to direct light to the first image sensor and the second optical module may comprise a second lens configured to direct light to the second image sensor. In some instances, at least one of the first optical module and the second optical module may be configured to optically zoom. Optionally, the first optical module and the second optical module may be configured to digitally zoom. In some instances, at least one of the first lens or the second lens may be a prime lens. Optionally, at least one of the first lens or the second lens may be a zoom lens.

In some instances, the first focal length range or the second focal length range may encompass a plurality of focal lengths. Optionally, the first focal length range or the second focal length range may encompass a single focal length. In some instances, the first focal length range and the second focal length range may overlap. Optionally, the first focal length range and the second focal length range may not overlap. In some instances, the first image and the second image may not be centered on a same point. Optionally, the first image and the second image may be centered on a same point. In some instances, the first image sensor and second may have same size. In some instances, the display may be a local display. Optionally, the display may be a remote display.

In some embodiments, the second focal length range may encompass a larger focal length range than the first focal length range.

In some embodiments, the images may be displayed such that a second image captured by the second optical module having a larger focal length range is displayed within a first image captured by the first optical module having a smaller focal length range. In some instances, the second image may be centered on a point selected by a user within the first image. The method may further comprise rotating the second optical module or a carrier on which the first and second optical modules are carried to center the second image on the point selected by the user. In some instances, a zoom ratio may be considered in determining the second image that is displayed. In some instances, a size of the second image displayed within the first image may be selected by a user. In some embodiments, a portion of the first image may be displayed. The displayed portion of the first image may be selected by a user. Alternatively or additionally, a portion of the second image may be displayed. The displayed portion of the second image may be selected by a user.

Alternatively, the images may be displayed such that a second image captured by the second optical module having a larger focal length range is displayed within a third image obtained from combining the second image and the first image captured by the first optical module having a smaller focal length range. In some instances, the second image and first image may be combined by an interpolation algorithm to obtain the third image. The interpolation algorithm may be a cubic interpolation or a bilinear interpolation. In some instances, the second image may be centered on a point selected by a user within the first image. The method may further comprise rotating the second optical module or a carrier on which the first and second optical modules are carried to center the second image on the point selected by the user. In some instances, a size of the second image displayed within the third image may be selected by a user.

Alternatively, one of a first image captured by the first optical module having a smaller focal length range and a second image captured by the second optical module having a larger focal length range may be displayed on the display. In some instances, a portion of the one of the first image and the second image may be displayed on the display. The displayed portion of the one of the first image and the second image may be selected by a user. In some embodiments, the first focal length range and the second focal length range may overlap. A displaying of the first image may be switched to a displaying of the second image by soft switching. Alternatively, the first focal length range and the second focal length range may not overlap. A displaying of the first image may be switched to a displaying of the second image by an interpolation algorithm, such as a cubic interpolation or a bilinear interpolation.

Aspects of the disclosure may further include an unmanned aerial vehicle (UAV), comprising: one or more propulsion units configured to effect flight of the UAV; a first optical module comprising a first image sensor, said first optical module having a first field of view angular range; a second optical module comprising a second image sensor, said second optical module having a second field of view angular range, wherein the first field of view angular range and the second field of view angular range are different; and an image processor configured to receive image data for the first image from the first optical module and/or image data for the second image from the second optical module and generate data to display images captured using the first optical module and/or the second optical module, wherein the first optical module and/or the second optical module are movable relative to the one or more propulsion units of the UAV.

In some embodiments, the image processor may be configured to selectively receive image data from the first optical module or the second optical module by implementing a hardware switching technique. In some instances, a selection of the first optical module or the second optical module may be effected according to an external instruction of a target zoom ratio. Alternatively, the image processor may be configured to receive image data from the first optical module and the second optical module and store the image data in corresponding buffers. In some instances, the image data may be read from the corresponding buffers and processed according to an external instruction of a target zoom ratio.

In some embodiments, the UAV may be a multi-rotor aerial vehicle. In some embodiments, the first optical module and/or the second optical module may be movable relative to the one or more propulsion units of the UAV via a carrier that supports the first optical module and the second optical module. In some instances, the carrier may permit rotation of the first optical module and/or the second optical module about at least one axis. Optionally, the carrier may permit rotation of the first optical module and/or the second optical module about at least two axes. In some embodiments, the first optical module and/or the second optical module may be movable relative to a central body of the UAV.

Aspects of the disclosure may further include a method of collecting image data using an unmanned aerial vehicle (UAV), said method comprising: effecting flight of the UAV using one or more propulsion units; capturing, at a first optical module comprising a first image sensor, a first image, wherein said first optical module has a first focal length range; capturing, at a second optical module comprising a second image sensor, a second image, wherein said second optical module has a second focal length range, wherein the first focal length range and the second focal length range are different; and receiving image data for the first image from the first optical module and/or image data for the second image from the second optical module; generating data to display the first image and/or the second image; and effecting movement of the first optical module and/or the second optical module relative to the one or more propulsion units.

In some embodiments, receiving image data for the first image from the first optical module and/or image data for the second image from the second optical module includes selectively receiving image data from the first optical module or the second optical module by implementing a hardware switching technique. In some instances, a selection of the first optical module or the second optical module may be effected according to an external instruction of a target zoom ratio. Alternatively, receiving image data for the first image from the first optical module and/or image data for the second image from the second optical module may include receiving image data from the first optical module and the second optical module and storing the image data in corresponding buffers. In some instances, the image data may be read from the corresponding buffers and processed according to an external instruction of a target zoom ratio.

In some embodiments, the UAV may be a multi-rotor aerial vehicle. In some embodiments, the first optical module and/or the second optical module may be movable relative to the one or more propulsion units of the UAV via a carrier that supports the first optical module and the second optical module. In some instances, the carrier may permit rotation of the first optical module and/or the second optical module about at least one axis. Optionally, the carrier may permit rotation of the first optical module and/or the second optical module about at least two axes. In some embodiments, the first optical module and/or the second optical module may be movable relative to a central body of the UAV.

Aspects of the disclosure may further include an unmanned aerial vehicle (UAV), comprising one or more propulsion units configured to effect flight of the UAV; a first optical module comprising a first image sensor, said first optical module having a first focal length range; a second optical module comprising a second image sensor, said second optical module having a second focal length range, wherein the first focal length range and the second focal length range are different; and an image processor configured to receive image data for the first image from the first optical module and/or image data for the second image from the second optical module and generate data to display the first image and/or the second image captured using the first optical module and/or the second optical module, wherein the first optical module and/or the second optical module are movable relative to the one or more propulsion units of the UAV.

In some embodiments, the image processor may be configured to selectively receive image data from the first optical module or the second optical module by implementing a hardware switching technique. In some instances, a selection of the first optical module or the second optical module may be effected according to an external instruction of a target zoom ratio. Alternatively, the image processor may be configured to receive image data from the first optical module and the second optical module and store the image data in corresponding buffers. In some instances, the image data may be read from the corresponding buffers and processed according to an external instruction of a target zoom ratio.

In some embodiments, the UAV may be a multi-rotor aerial vehicle. In some embodiments, the first optical module and/or the second optical module may be movable relative to the one or more propulsion units of the UAV via a carrier that supports the first optical module and the second optical module. In some instances, the carrier may permit rotation of the first optical module and/or the second optical module about at least one axis. Optionally, the carrier may permit rotation of the first optical module and/or the second optical module about at least two axes. In some embodiments, the first optical module and/or the second optical module may be movable relative to a central body of the UAV.

Aspects of the disclosure may further include a method of collecting image data using an unmanned aerial vehicle (UAV), said method comprising: effecting flight of the UAV using one or more propulsion units; capturing, at a first optical module comprising a first image sensor, a first image, wherein said first optical module has a first focal length range; capturing, at a second optical module comprising a second image sensor, a second image, wherein said second optical module has a second focal length range, wherein the first focal length range and the second focal length range are different; receiving image data for the first image from the first optical module and/or image data for the second image from the second optical module; generating data to display the first image and/or the second image captured using the first optical module and/or the second optical module; and effecting movement of the first optical module and/or the second optical module relative to the one or more propulsion units.

In some embodiments, receiving image data for the first image from the first optical module and/or image data for the second image from the second optical module includes selectively receiving image data from the first optical module or the second optical module by implementing a hardware switching technique. In some instances, a selection of the first optical module or the second optical module may be effected according to an external instruction of a target zoom ratio. Alternatively, receiving image data for the first image from the first optical module and/or image data for the second image from the second optical module may include receiving image data from the first optical module and the second optical module and storing the image data in corresponding buffers. In some instances, the image data may be read from the corresponding buffers and processed according to an external instruction of a target zoom ratio.

In some embodiments, the UAV may be a multi-rotor aerial vehicle. In some embodiments, the first optical module and/or the second optical module may be movable relative to the one or more propulsion units of the UAV via a carrier that supports the first optical module and the second optical module. In some instances, the carrier may permit rotation of the first optical module and/or the second optical module about at least one axis. Optionally, the carrier may permit rotation of the first optical module and/or the second optical module about at least two axes. In some embodiments, the first optical module and/or the second optical module may be movable relative to a central body of the UAV.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems and methods described herein permit achievement of a large zoom ratio by using two or more optical modules. An imaging system may comprise a first optical module and a second optical module that are juxtaposed and aligned to capture images from the same direction. In some embodiments, the first and second optical module may have different field of view (FOV) angular ranges. Alternatively, the first and second optical module may have different focal length ranges. An image processor may receive the image data from the first and second optical module and generate data to show images captured using the first and second optical modules simultaneously or separately within a display. At least one of the first and second optical modules may comprise a prime lens or a zoom lens, and the FOVs or the focal length ranges of the first and second optical modules may or may not overlap.

In the systems and methods described herein, a zoom ratio higher than either of the two optical modules may be achieved and a Picture-In-Picture (PIP) function may be implemented by designing FOVs or focal length ranges of the first and second optical modules. Advantageously, the systems and methods provided herein implement both wide lens and telephoto lens with simple configuration and small size.

The imaging system may be installed on a stationery object or a movable object. A movable object may be capable of self-propelled movement (e.g., a vehicle), while a stationary object may not be capable of self-propelled movement. In some embodiments, the movable object may be an unmanned aerial vehicle (UAV). The UAV may have one or more propulsion units that may permit the UAV to move about in the air. The UAV may be a rotorcraft. In some instances, the UAV may be a multi-rotor craft that may include a plurality of rotors. The plurality or rotors may be capable of rotating to generate lift for the UAV, enabling the UAV to move about freely through the air (e.g., with up to three degrees of freedom in translation and/or up to three degrees of freedom in rotation). In some embodiments, the imaging system of present disclosure may be onboard the UAV. Additional examples of movable objects suitable for use with the embodiments of the present disclosure are provided in further detail below.

Figure 1:
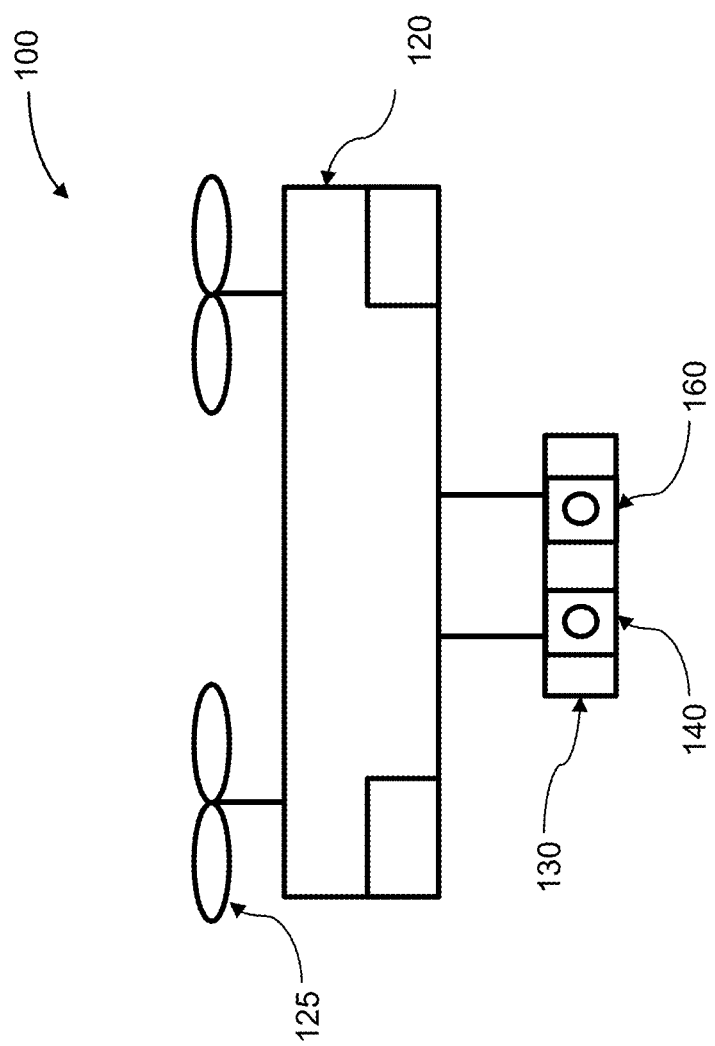
FIG. 1 shows an example of an unmanned aerial vehicle (UAV) carrying an imaging system having two optical modules, in accordance with some embodiments of the disclosure.

FIG. 1 shows an example of an unmanned aerial vehicle (UAV) 100 carrying an imaging system having two or more optical modules, in accordance with some embodiments of the disclosure. Any description herein of the imaging system supported by the UAV may apply to any other type of imaging system, or an imaging system supported by any movable object. The UAV may have a body 120. In some instances, the body may be a central body which may have one or more branching members, or "arms." The arms may extend outward from the central body in a radial manner and be joined via the central body. The number of arms may match the number of propulsion units 125, or rotors, of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units of the UAV.

An imaging system 130 may be supported by the UAV. The imaging system may be directly coupled to the UAV or may be coupled to the UAV via a carrier. The imaging system may comprise a plurality of optical modules. For example, one, two, three, four, five, six, or more optical modules may be provided. Any description of a first optical module and a second optical module may apply to any number of optical modules.

The first optical module 140 and second optical module 160 may be rigidly coupled to the UAV. Alternatively, the first optical module and second optical module may be permitted to move relative to the UAV 120 with respect to up to six degrees of freedom. The first optical module and second optical module may be directly mounted onto the UAV, or coupled to a support structure mounted onto the UAV. In some embodiments, the first optical module and second optical module may be an element of a payload of the UAV. In some embodiments, the first optical module and second optical module may be installed on a carrier of the UAV. In some embodiments, the carrier may be a gimbal. In some instances, the first optical module and/or second optical module may be movable relative to one or more propulsion units of the UAV via the carrier. For instance, the carrier may permit rotation of the first optical module and/or the second optical module about at least one axis. Optionally, the carrier permits rotation of the first optical module and/or the second optical module about at least two or three axes. The first optical module and/or second optical module may be movable relative to a central body of the UAV. The first optical module and/or the second optical module may translate relative to the central body of the UAV along one, two, three or more axes.

The first optical module and second optical module may each capture images of an environment of the UAV. The first optical module 140 and/or second optical module 160 may each continuously capture images. Alternatively, the first optical module 140 and/or second optical module 160 may each capture images at a specified frequency to produce a series of image data over time. Multiple modules of an imaging system may capture images at a high enough frequency to provide video-rate capturing. Images may be captured at a rate of at least 10 Hz, 20 Hz, 30 Hz, 40 Hz, 50 Hz, 60 Hz, 70 Hz, 80 Hz, 90 Hz, 100 Hz, 120 Hz, 150 Hz, 200 Hz, 250 Hz, or 300 Hz.

Each of the optical modules of an imaging system may comprise an image sensor. They may also comprise a lens. For instance, the first optical module 140 and the second optical module 160 may each comprise an image sensor and a lens. The lens may be configured to direct light to the image sensor. Optionally, other optical elements, such as mirrors, filters, gratings, additional lenses, or dichroics, may be provided that may aid in directing light to the image sensor. Alternatively, no lens or optical elements are provided. Each module of an imaging system may have the same optical set-up. Alternatively, each module of the imaging system may have different optical set-ups, or at least two optical modules of an imaging system may have different optical set-ups. In some embodiments, a first optical module may have a stationary lens while a second optical module may have a movable lens. In other embodiments, the first and second optical modules may have movable lenses that may have different dimensions or shapes, or that may move by different amounts.

An imaging system may have a housing. Multiple optical modules of the imaging system may be provided within a single housing. Alternatively, different optical modules may be provided in different housings. In one example, a first optical module and a second optical module may be provided in one housing and thus share the housing. Alternatively, the first optical module and second optical module may be provided in different housings. A housing may encapsulate one, two or more optical modules. In some embodiments, a housing may be substantially fluid-tight. The housing may be air-tight. The housing may be formed from a substantially opaque material, translucent material, or transparent material. The housing may prevent unwanted light from entering the housing. The housing may limit light reaching the optical modules to one or more controlled entrances. In some embodiments, multiple optical modules of an imaging system may be supported by a single housing. The optical modules may be within the housing, on an exterior of a housing, or at least partially embedded in a housing. The housing may cause the optical modules to move together. For instance, the optical modules may be movable as a single unit. The optical modules may rotate together about one or more axes, or may translate together along one or axes.

An image sensor is a device that converts an optical image into an electronic signal. The image sensors of present disclosure may be a charge-coupled devices (CCD) type, a complementary metal-oxide-semiconductor (CMOS) type, a N-type metal-oxide-semiconductor (NMOS) type, or a backside illuminated CMOS (BSI-CMOS) type. A first optical module and a second optical module of an imaging system may have the same type of image sensor, or different types of image sensors. The image sensors may have the same characteristics or may have different characteristics. For example, the image sensors may be capable of capturing an image of the same resolution, or may have different resolutions at which images can be captured. For instance, one of the image sensors may permit a resolution of 25%, 50%, 75%, 100%, 125%, 150%, 200%, 300%, 400%, 500%, or 1000% of the other image sensor. The image sensors may have the same size or may have different sizes. The image sensors may use the same amount of processing power, or may use different amounts of processing power. The image sensors of the different optical modules may consume the same amount of power or may consume different amounts of power.

In some embodiments, the first optical module and second optical module may have the same size. For instance, the first optical module and the second optical module may have the same volume. The first optical module and the second optical module may have one, two, or three of the same dimensions (e.g., length, width, height). The first optical module and the second optical module may have the same weight. Alternatively, the first optical module and second optical module may have different size. For instance, the first optical module and the second optical module may have different volumes. The first optical module may have a volume that is 25%, 50%, 75%, 100%, 125%, 150%, 200%, 300%, 400%, 500%, or 1000% of the second optical module. The first optical module and the second optical module may have one, two, or three different dimensions (e.g., length, width, height). The first optical module and the second optical module may have different weights. The first optical module may have a weight that is 25%, 50%, 75%, 100%, 125%, 150%, 200%, 300%, 400%, 500%, or 1000% of the second optical module.

A lens of a first optical module 140 and a lens of second optical module 160 may be an optical zoom type or a digital zoom type lens. An optical zoom may enlarge an image with the aid of a set of optical lenses. A digital zoom may be a simulating of optical zoom effect by using image processing algorithms to enlarge a portion of a captured image. In some embodiments, both the lens of the first optical module and the lens of the second optical module may be an optical zoom type lens. Alternatively, both the lens of the first optical module and the lens of the second optical module may be a digital zoom type lens. Optionally, one of the lens of the first optical module and the lens of the second optical module may be an optical zoom type lens, and the other one may be a digital zoom type lens. In some embodiments, an optical zoom type lens may move along one or more axis relative to a corresponding image sensor. Movement of the lens may permit the optical zoom. Optionally, a digital zoom type lens may remain stationary relative to a corresponding image sensor, or may move less than an optical zoom type lens.

An image processor may be provided to receive image data from the first optical module 140 and/or the second optical module 160 and generate data to display at least one image captured using the first optical module and/or the second optical module. In some embodiments, the image processor may be provided onboard the UAV 100. The image processor may be provided on a central body 120 of the UAV. The image processor may be provided on a branch or arm of the UAV. The image processor may be provided on-board an imaging system of the UAV. In some instances, the imaging system may be a camera with multiple optical modules. The image processor may be within or outside a housing of the imaging system. In some instances, the image processor may be provided off-board the imaging system of the UAV. The image processor may be provided on a carrier. Alternatively, the image processor may be provided remote to the UAV. For instance, the image processor may be provided on a remote controller, server, ground station, or cloud-based infrastructure. Information from one or more optical modules may be wirelessly transmitted to the image processor. Alternatively, information from the optical modules may be provided to the image processor via a physical connection.

In some embodiments, the image processor may be configured to selectively receive image data from the first optical module or the second optical module by implementing a hardware switching technique. In some instances, a selection of the first optical module or the second optical module may be effected according to an external instruction of a target zoom ratio. For instance, an instruction of a target zoom ratio may be received from the user through a remote terminal. The user may select a desired target zoom ratio and send the instruction of a target zoom ratio by operating buttons provided on the remote terminal or by touching soft buttons displayed on a screen of the remote terminal.

In some embodiments, the image processor may be configured to receive image data from the first optical module and the second optical module and store the image data in corresponding buffers. In some instances, the image data may be read from the corresponding buffers and processed according to an external instruction of a target zoom ratio.

The first optical module 140 and second optical module 160 may be juxtaposed and aligned to capture images from the same direction. In some embodiments, the optical axes of the first optical module 140 and second optical module 160 may be parallel. The optical axes of the first optical module and the second optical module may diverge by less than 30 degrees, 25 degrees, 20 degrees, 15 degrees 10 degrees, 5 degrees, 3 degrees, 1 degree, 0.5 degrees, or 0.1 degrees. If the optical axes of the first optical module and the second optical module diverge from each other, image correction technology may be employed. The first optical module and the second optical module may be immediately adjacent to one another. A spacing between the first optical module 140 and second optical module 160 may be small if compared with a distance from an object/scene, the spacing may be omitted and the first optical module 140 and second optical module 160 may capture the image of an identical object/scene. In some instances, a spacing between the first optical module 140 and second optical module 160 may be less than or equal to 1 mm, 2 mm, 3 mm, 4 mm, 5 mm, 6 mm, 7 mm, 8 mm, 9 mm, 1 cm, 1.5 cm, 2 cm, 2.5 cm, 3 cm, 3.5 cm, 4 cm, 4.5 cm, 5 cm, 6 cm, 7 cm, 8 cm, 9 cm, 10 cm, 12 cm, 14 cm, 16 cm, 18 cm, 20 cm, 22 cm, 24 cm, 26 cm, 28 cm, 30 cm, 35 cm, 40 cm, 45 cm, or 50 cm. Optionally, the spacing between the first optical module 140 and second optical module 160 may be greater than or equal to any of the values described herein. The spacing between the first optical module 140 and second optical module 160 may have a value falling within a range between any two of the values described herein.

A plurality of optical modules of an imaging system may be within a same lateral plane. For example, multiple optical modules may be side by side. Alternatively, multiple optical modules may be stacked on top of another. The plurality of optical modules may be at about the same height relative to an underlying surface.

Optical modules of an imaging system may remain stationary relative to one another. Optical modules may remain stationary to one another while the imaging system moves relative to an environment. Alternatively, the optical modules may be movable relative to one another.

A focal length of an imaging system is a measure of how strongly the system converges or diverges light. The focal length of an optical lens is the distance over which initially collimated rays are brought to a focus. There are two types of lenses: prime and zoom. A prime lens may have a fixed focal length and the focal length may encompass a single focal length. A zoom lens may have variable focal lengths and the focal length may encompass a plurality of focal lengths. An optical zoom lens may vary the focal length by a relative movement of a set of internal lens elements. A digital zoom lens may implement a variable focal length effect by an algorithm. In some embodiment, both the lens of the first optical module 140 and the lens of the second optical module 160 may be zoom lenses. Alternatively, both the lens of the first optical module 140 and the lens of the second optical module 160 may be prime lenses. Optionally, one of the lens of the first optical module 140 and the lens of the second optical module 160 may be a prime lens and the other one may be a zoom lens.

Focal length ranges of multiple optical modules of the imaging system may be different. For instance, a first optical module may have a first focal length range that is different from a second focal length range of a second optical module. Additionally, there may be a third optical module having a third focal length range different from the first focal length range and/or the second focal length range, and so forth. The focal length range may depend on one or more lenses or other optical elements of the optical modules. For example, a first optical module may have a first focal length range based on the first lens, and a second optical module may have a second focal length range based on the second lens. A focal length range may include multiple focal lengths falling within a lower limit and an upper limit of the range. In some instances, a focal length range may include a single focal length. The single focal length may serve as both the lower limit and the upper limit of the range.

In some instances, the focal length ranges of zoom-type lenses of the first optical module 140 and second optical module 160 may be different. In some embodiments, the focal length ranges of the zoom-type lenses of the first optical module 140 and the second optical module 160 may overlap. Alternatively, the focal length ranges of the zoom-type lenses of the first optical module 140 and the second optical module 160 may not overlap. The focal lengths of prime-type lenses of the first optical module 140 and the second optical module 160 may be different. In some embodiments, the focal lengths of the prime-type lens of the first optical module 140 may fall within the focal length range of the zoom-type lens of the second optical module 160. Alternatively, the focal lengths of the prime-type lens of the first optical module 140 may not fall within the focal length range of the zoom-type lens of the second optical module 160.

In some instances, a focal length of a prime lens suitable for the optical module of present disclosure may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. Optionally, the focal length of a prime lens suitable for the optical module of present disclosure may be greater than or equal to any of the values described herein. The focal length of a prime lens suitable for the optical module of present disclosure may have a value falling within a range between any two of the values described herein. For instance, both the first optical module and the second optical module may be prime lenses and may have different focal length. The first optical module may have a focal length that is 25%, 50%, 75%, 100%, 125%, 150%, 200%, 300%, 400%, 500%, or 1000% of the second optical module.

In some instances, a lower limit of the focal length range for a zoom lens suitable for the optical module of present disclosure may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, or 1150 mm. Optionally, the lower limit of the focal length range for a zoom lens suitable for the optical module of present disclosure may be greater than or equal to any of the values described herein. The lower limit of the focal length range for a zoom lens suitable for the optical module of present disclosure may have a value falling within a range between any two of the values described herein.

In some instances, an upper limit of the focal length range for a zoom lens suitable for the optical module of present disclosure may be less than or equal to 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 2000 mm. Optionally, the upper limit of the focal length range for a zoom lens suitable for the optical module of present disclosure may be greater than or equal to any of the values described herein. The upper limit of the focal length range for a zoom lens suitable for the optical module of present disclosure may have a value falling within a range between any two of the values described herein.

In photography, a field of view (FOV) is a part of the world that is visible through the camera at a particular position and orientation in space; objects outside the FOV when the picture is taken are not recorded in the photograph.

It is most often expressed as the angular size of the view cone, as an angle of view. For a normal optical lens, the field of view angle α can be calculated as FOV α=2 arctan (d/2f), where d is image sensor size, and f is focal length of the lens. The field of view angle of an optical lens 200 may be illustrated in FIG. 2.

For an image sensor having a fixed size, a prime lens may have a fixed FOV and the FOV may encompass a single FOV angle. For an image sensor having a fixed size, a zoom lens may have variable FOV angular range and the FOV angular range may encompass a plurality of FOV angles. In some embodiment, both the lenses of the first optical module 140 and second optical module 160 may be zoom lenses. Alternatively, both the lenses of the first optical module 140 and second optical module 160 may be prime lenses. Optionally, one of the lenses of the first optical module 140 and second optical module 160 may a prime lens and the other one may be a zoom lens.

Field of view angular ranges of multiple optical modules of the imaging system may be different. For instance, a first optical module may have a first FOV angular range that is different from a second FOV angular range of a second optical module. Additionally, there may be a third optical module having a third FOV angular range different from the first FOV angular range and/or the second FOV angular range, and so forth. The FOV angular range may depend on one or more lenses or other optical elements of the optical modules. For example, a first optical module may have a first FOV angular range based on the first lens, and a second optical module may have a second FOV angular range based on the second lens. A FOV angular range may include multiple FOV angles falling within a lower limit and an upper limit of the range. In some instances, a FOV angular range may include a single angle. The single angle may serve as both the lower limit and the upper limit of the FOV angular range.

The FOV angular ranges of the zoom-type first optical module 140 and second optical module 160 may be different. In some embodiments, the FOV angular ranges of the zoom-type first optical module 140 and second optical module 160 may overlap. In some instances, the FOV angular ranges of the first optical module 140 and second optical module 160 may not be centered on a same point and have an overlapped range. For instance, a distance between the first optical module 140 and second optical module 160 may lead to the centers of the FOV angular ranges of the two optical modules slightly apart. In view that the distance between the two optical modules may be small if compared with a distance between the two optical modules and the captured object, a distance between centers of the FOV angular ranges of the two optical modules may be ignored for the ease of calculation. Optionally, the FOV angular ranges of the first optical module 140 and second optical module 160 may be centered on a same point and have an overlapped range.

Alternatively, the FOV angular ranges of the zoom-type first optical module 140 and second optical module 160 may not overlap. For instance, the FOV angular ranges of the first optical module 140 and second optical module 160 may be centered on a same point and not have an overlapped range. The FOV of the prime-type first optical module 140 and second optical module 160 may be different. In some embodiments, the FOV of the prime-type first optical module 140 may fall within the FOV angular range of the zoom-type second optical module 160. Alternatively, the FOV of the prime-type first optical module 140 may not fall within the FOV angular range of the zoom-type second optical module 160.

In some instances, a FOV of a prime lens suitable for the optical module of present disclosure may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the FOV of a prime lens suitable for the optical module of present disclosure may be less than or equal to any of the values described herein. The FOV of a prime lens suitable for the optical module of present disclosure may have a value falling within a range between any two of the values described herein.

In some instances, a lower limit of the FOV angular range for a zoom lens suitable for the optical module of present disclosure may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the lower limit of the FOV angular range for a zoom lens suitable for the optical module of present disclosure may be less than or equal to any of the values described herein. The lower limit of the FOV angular range for a zoom lens suitable for the optical module of present disclosure may have a value falling within a range between any two of the values described herein.

In some instances, an upper limit of the FOV angular range for a zoom lens suitable for the optical module of present disclosure may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the upper limit of the FOV angular range for a zoom lens suitable for the optical module of present disclosure may be less than or equal to any of the values described herein. The upper limit of the FOV angular range for a zoom lens suitable for the optical module of present disclosure may have a value falling within a range between any two of the values described herein.

A zoom ratio is a ratio of the longest to shortest focal lengths of zoom type imaging system such as a zoom camera. For example, a zoom lens with focal lengths ranging from 100 mm to 400 mm may be described as a 4:1 or "4×" zoom. The larger a zoom ratio of an optical module is, the larger a remote object may be shown on the captured image. The multiple optical modules in the imaging system of present disclosure may have different zoom ratio by, for example, providing different combination of lenses having different ratio of the longest to shortest focal lengths. In some instances, the zoom ratio of a zoom lens suitable for an optical module of present disclosure may higher than 1×, 1.5×, 2×, 2.5×, 3×, 3.5×, 4×, 4.5×, 5×, 5.5×, 6×, 6.5×, 7×, 7.5×, 8×, 8.5×, 9×, 9.5×, 10×, 11×, 12×, 13×, 14×, 15×, 16×, 17×, 18×, 19×, 20, 30×, 40×, 50×, 60×, 70×, 80×, 100×, 120×, 140×, 160×, 180×, 200×, 250×, 300×, 350×, 400×, 450×, 500×, 600×, 700×, 800×, or 1000×. Optionally, the zoom ratio of a zoom lens suitable for an optical module of present disclosure may be higher than or equal to any of the values described herein. The zoom ratio of a zoom lens suitable for an optical module of present disclosure may have a value falling within a range between any two of the values described herein. For instance, the first optical module and the second optical module may have different zoom ratios. The first optical module may have a zoom ratio that is 25%, 50%, 75%, 100%, 125%, 150%, 200%, 300%, 400%, 500%, or 1000% of the second optical module.

Figure 3:
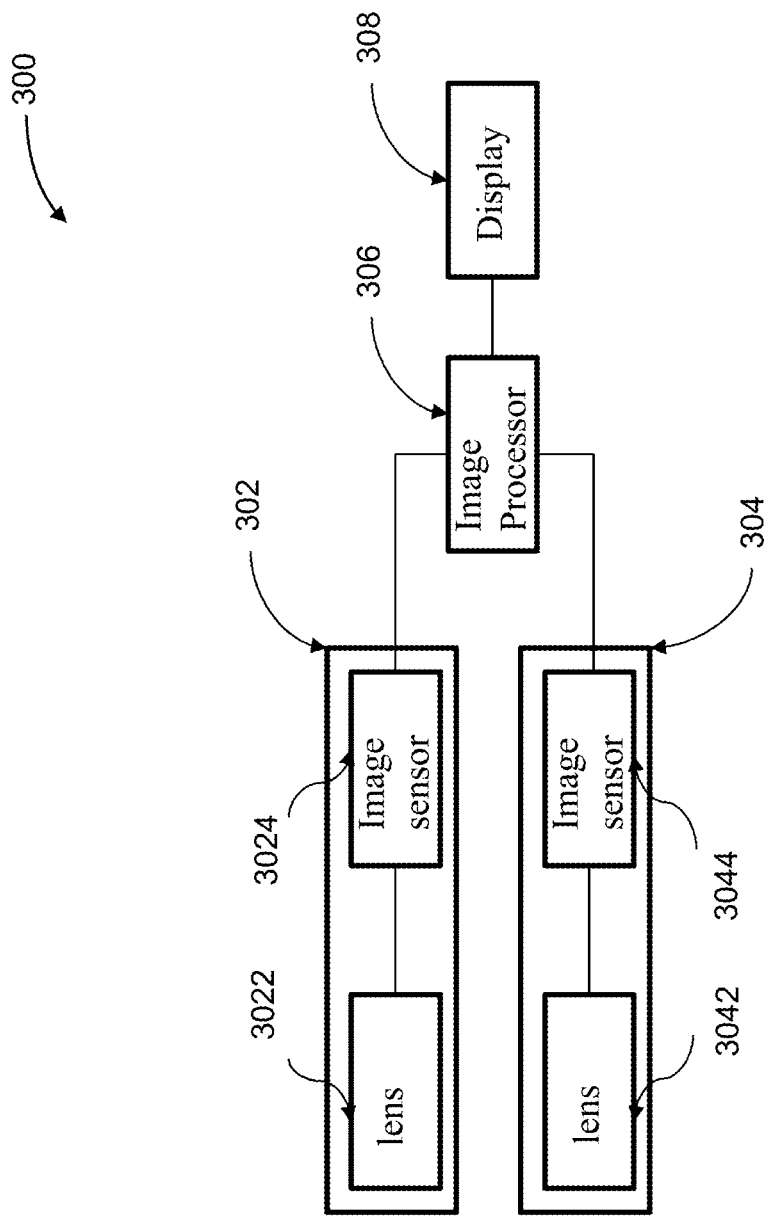
FIG. 3 is a schematic illustration by way of block diagram of an imaging system, in accordance with some embodiments of the disclosure.

FIG. 3 is a schematic illustration by way of block diagram of an imaging system 300, in accordance with some embodiments of the present disclosure. In some embodiments, the imaging system may comprise a first optical module 302, a second optical module 304, and an image processor 306.

The first optical module 302 may comprise a first optical lens 3022 and a first image sensor 3024. The first optical lens 3022 may direct light to the first image sensor 3024. The second optical module 304 may comprise a second optical lens 3042 and a second image sensor 3044. The second optical lens 3042 may direct light to the second image sensor 3044. The optical lenses 3022 and 3042 may be optical zoom type or digital zoom type lenses.

In some embodiment, both the first optical lens 3022 and second optical lens 3042 may be zoom lenses. Alternatively, both the first optical lens and second optical lens may be prime lenses. Optionally, one of the both the first optical lens 3022 and second optical lens 3042 may be a prime lens and the other one may be a zoom lens. An imaging system may include any number of optical modules, which may include any combination of prime lens(es) and zoom lens(es). In some embodiments, both the first optical lens 3022 and the second optical lens 3042 may be optical zoom type lenses. Alternatively, both the first optical lens 3022 and the second optical lens 3042 may be a digital zoom type lenses. Optionally, one of the first optical lens 3022 and second optical lens 3042 may be an optical zoom type lens, and the other one may be a digital zoom type lens. In some embodiments, the FOV angular ranges of the first optical lens 3022 and the second optical lens 3042 may overlap. Alternatively, the FOV angular ranges of the first optical lens 3022 and the second optical lens 3042 may not overlap.

An image processor 306 may be connected to the first optical module 302 and the second optical module 304. The image processor 306 may be configured to receive image data from the first optical module 302 and the second optical module 304, and generate data to show images, which are captured using the first optical module 302 and the second optical module 304, within a display 308. In some embodiments, the image processor 306 may be configured to generate data to separately show a first image or a second image, which are respectively captured by the first optical module 302 and the second optical module 304, within the display 308. In this mode, only one image may be displayed. For instance, only the first image, which is captured by the first optical module 302 having a wider FOV may be displayed on the display 308. This separate displaying mode may be activated to have an overall image (e.g., a wider FOV) or a detailed image (e.g., a narrower FOV) only. Alternatively, the image processor 306 may be configured to generate data to show both the first image and the second image, which are respectively captured by the first optical module 302 and the second optical module 304, within the display 308. For instance, both the first image and the second image may be simultaneously displayed on the display 308 on a predetermined pattern. This simultaneous displaying mode may be activated to have both an overall image and a detailed image, such as a PIP (Picture in Picture) effect.

In some embodiments, the image processor 306 may be provided as part of circuit of the movable or stationary object carrying the imaging system 300. Alternatively, the image processor 304 may be provided as an independent circuit, module or chip. The image processor 306 may be implemented by Central Processing Unit (CPU), Application Specific Integrated Circuit (ASIC), or Field Programmable Gate Array (FPGA). Any description herein of a processor may apply to one or more processors, which may individually or collectively perform any functions described for the image processor. The image processor may include a single or multiple processors. The image processor may be capable of executing one or more steps in accordance with non-transitory computer readable media comprising code, logic, or instructions for performing one or more steps. Memory storage units may be provided which may comprise the non-transitory computer readable media.

The display 308 may be a device appropriate for displaying images or videos, for example, a LCD (Liquid Crystal Display), a CRT (Cathode Ray Tube), an OLED (Organic Light Emitting Diodes), or a Plasma. The display 308 may be configured to show the images captured by the first optical module 302 and/or the second optical module 304. The display 308 may display the image based on the image data generated by the image processor 304. In some embodiments, the display 308 may be a local display device of the imaging system 300. In some instances, the display 308 may be provided on the movable object or the stationary object carrying the imaging system. Alternatively, the display 308 may be a display device configured to remote to the imaging system 300. In some instances, the display 308 may be a remote terminal such as a smartphone, a tablet, a laptop or a personal computer, which receives the image data from the imaging system 300 via a wireless link. The wireless link between the imaging system 300 and the display 308 may be a RF (radio frequency) link, a Wi-Fi link, a Bluetooth link, a 3G link, or a LTE link.

The display 308 may also function as an input device for receiving a user's instruction with regard to the image displaying. In some instance, the display 308 may be an interactive screen, by which the user may select a pattern of displaying the images captured by the first and second optical modules by touching soft buttons on the display. The display 308 may be a touchscreen. Alternatively, the user may interact with the display using any user interactive device, such as a mouse, keyboard, joystick, trackball, touchpad, or microphone. The first image and second image captured by the first optical module 302 and the second optical module 304 may be displayed on the display 308 with a predetermined pattern. In some instances, only one of the first image and second image captured by the first optical module 302 and the second optical module 304 may be displayed on the display 308. Alternatively, both the first image and second image captured by the first optical module 302 and the second optical module 304 may be displayed on the display 308 with a up and down pattern, a left and right pattern, a large and small pattern, picture in picture (PIP) pattern, etc. The first image captured by the first optical module and the second image captured by the second optical module may be displayed in response to a user interaction with the display. The first and second images may be displayed simultaneously on a display. The first and second images may be shown on a display at the same time. Both the first and second images may be visually discernible to a user viewing the display at the same time at some point in time.

Figure 4:
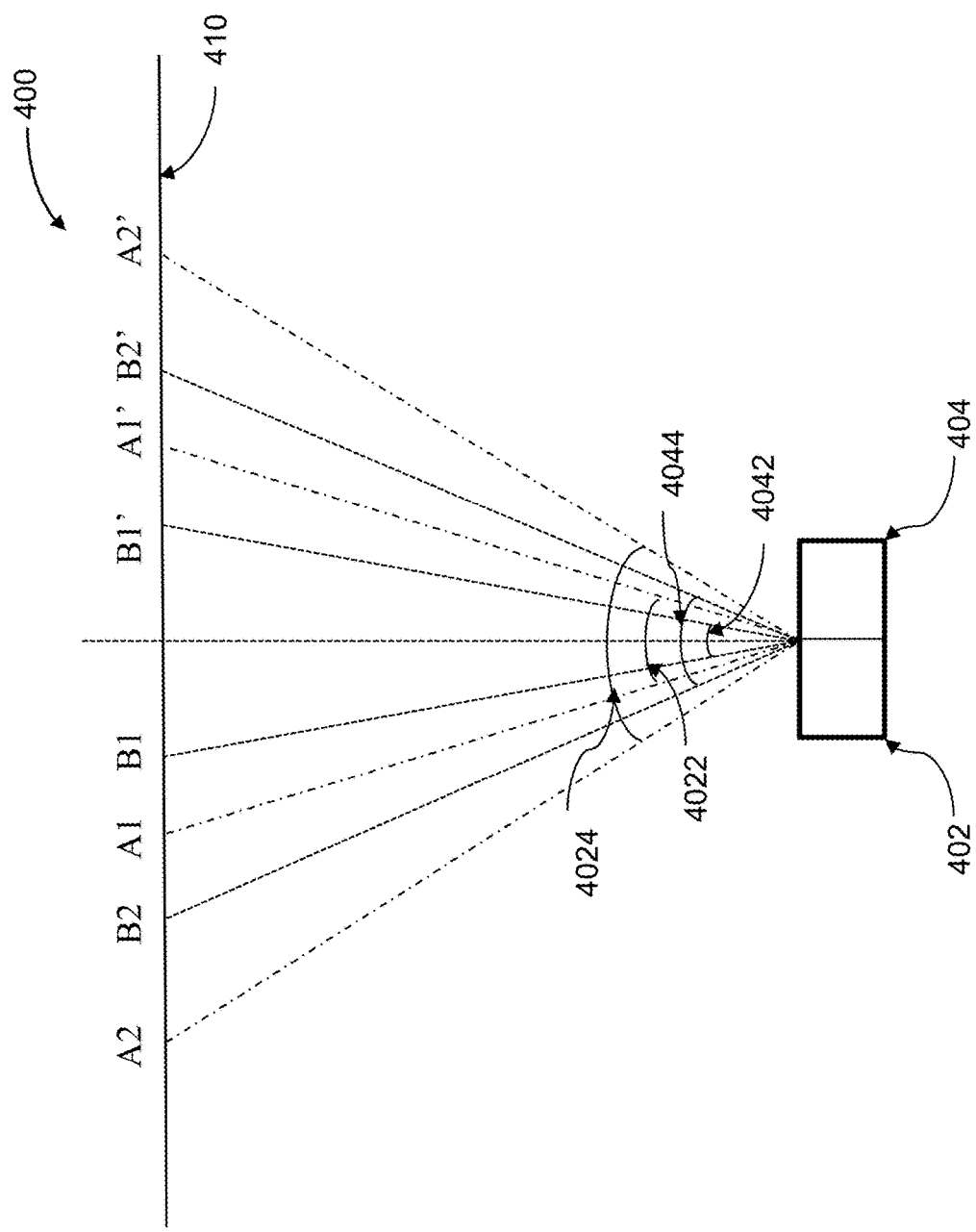
FIG. 4 illustrates the overlapping field of view angles of optical modules in an imaging system, in accordance with some embodiments of the disclosure.

FIG. 4 illustrates the overlapping field of view angles of optical modules in an imaging system, in accordance with some embodiments of the present disclosure. In the illustration of FIG. 4, the first optical module 402 and the second optical module 404 may be juxtaposed and aligned to capture images from the same direction. The optical axes of the first optical module 402 and the second optical module 404 may be parallel. A distance between the first optical module 402 and the second optical module 404 may be small as compared to a distance to the object 410, thus may be ignored for the ease of calculation.

In the embodiments shown in FIG. 4, the first FOV range of the first optical module 402 may encompass a wider FOV angle than the second FOV range of the second optical module 404. The first optical module 402 may have a first FOV ranging from angle 4022 to angle 4024. The image captured by the first optical module 402 at a minimal FOV of angle 4022 may cover a portion A1-A1' of the object 410, and the image captured by the first optical module 402 at a maximum FOV of angle 4024 may cover a larger portion A2-A2' of the object 410. Therefore, the image captured by the first optical module 402 may "view" the object 410 with a minimal portion A1-A1' and a maximum portion A2-A2'. Likewise, the image captured by the second optical module 404 at a minimal FOV of angle 4042 may cover a portion B1-B1' of the object 410, and the image captured by the second optical module 404 at a maximum FOV of angle 4044 may cover a larger portion B2-B2' of the object 410. Therefore, the image captured by the second optical module 404 may "view" the object 410 with a minimal portion B1-B1' and a maximum portion B2-B2'. In some embodiments, the size of first image sensor in the first optical module 402 and the size of second image sensor in the second optical module 404 may be the same. Consequently, according to the equation as discussed with reference to FIG. 2, the second optical module 404 having a narrower FOV may have larger focal length than the first optical module 402 having a wider FOV; therefore, the images captured by the second optical module 404 may have a larger zoom ratio than the first optical module 402, which means that the images captured by the second optical module 404 may show more details of the object 410. Optionally, at the same time the images captured by the second optical module may have a narrower FOV.

In the embodiments shown in FIG. 4, the first FOV range of the first optical module 402 and the second FOV range of the second optical module 404 may overlap. For instance, the FOV angular ranges of the first optical module 402 and second optical module 404 may be centered on a same point and have an overlapped range from angle 4022 to angle 4044. Optionally, the FOV angular ranges of the first optical module and second optical module may not be centered on a same point and have an overlapped range. In case the size of first image sensor in the first optical module 402 and the size of second image sensor in the second optical module 404 are the same, the overlapping FOV ranges may mean that a focal length range of the first optical module 402 and a focal length range of the second optical module 404 overlap. For instance, the first optical module 402 may have a FOV angle range from 94.5° to 12.4°, which corresponds to a focal length range from 20 mm to 200 mm, and the second optical module 404 may have a FOV angle range from 23.3° to 6.19°, which corresponds to a focal length range from 105 mm to 600 mm. In this case, the first FOV range of the first optical module 402 and the second FOV range of the second optical module 404 may overlap from 23.3° to 12.4°, which corresponds to an overlapping in the focal length ranges of the first optical module 402 and the second optical module 404 from 105 mm to 200 mm. For image sensors having the same size, the second optical module 404 having a narrower FOV angle range, that is, having larger focal length range, may have a larger zoom ratio of the image.

In some embodiments, the first image and the second image, which are captured by the first optical module 402 having a wider FOV and the second optical module 404 having a narrower FOV respectively, may be displayed on a display device such that a second image captured by the second optical module 404 is displayed within the first image captured by the first optical module 402. A size, position and pattern of displaying the second image within the first image may be predetermined. In some instances, the second image may be displayed on a corner of the first image, a center of the first image, or a predetermined position of the first image, based on a predetermined display pattern. Optionally, the second image may be centered on a point selected by a user within the first image. For instance, a user may select a point in the first image (e.g., via touch, or any other user interactive device described herein), which may cause a region of the first image to be the second image which is a zoomed-in view of the region, wherein the region includes the point selected by the user. A user may move the selected point about the first image, which may cause the second image that is a zoomed-in view to correspondingly move to track the selected point. This may or may not include causing movement of the second optical module to track the selected point. Optionally, a first optical module may remain stationary while the second optical module may be moved. Optionally, a carrier on which the first and second optical modules are carried may move to track the user selected point. Optionally, the second optical module may not move, but only a subset of the second image is displayed at a time so that movement of the selected point causes a different subset of the second image to be displayed.

In some embodiments, a zoom ratio may be considered in determining the second image that is displayed. For instance, the user may want to have a 6× zoom ratio effect in an imaging system having a first optical module 402 may have a FOV angle range from 94.5° to 12.4° (which corresponds to a focal length range from 20 mm to 200 mm) and a second optical module 404 may have a FOV angle range from 23.3° to 6.19° (which corresponds to a focal length range from 105 mm to 600 mm). If the first image is captured by the first optical module 402 at a focal length 20 mm, then the second image may be captured by the second optical module 404 at a focal length 120 mm, in order to achieve the desired 6× zoom ratio.

In some embodiments, only one of the first image and the second image, which are captured by the first optical module 402 having a wider FOV and the second optical module 404 having a narrower FOV respectively, may be displayed on a display device. In some instances, the FOV angular range of the first optical module 402 and the FOV angular range of the second optical module 404 may overlap. In this case, a displaying of the first image captured by the first optical module 402 may be switched to a displaying of the second image captured by the second optical module 404 by soft switching. For example, a transition from displaying the first image to the second image may be effected by a smooth manner. In some embodiments, the image data from both the first optical module 402 and the second optical module 404 may be processed by way of weighting to generate the image data to be displayed on the display device. By means of the soft switching, a user may not notice the transition from displaying the first image to the second image.

Figure 5:
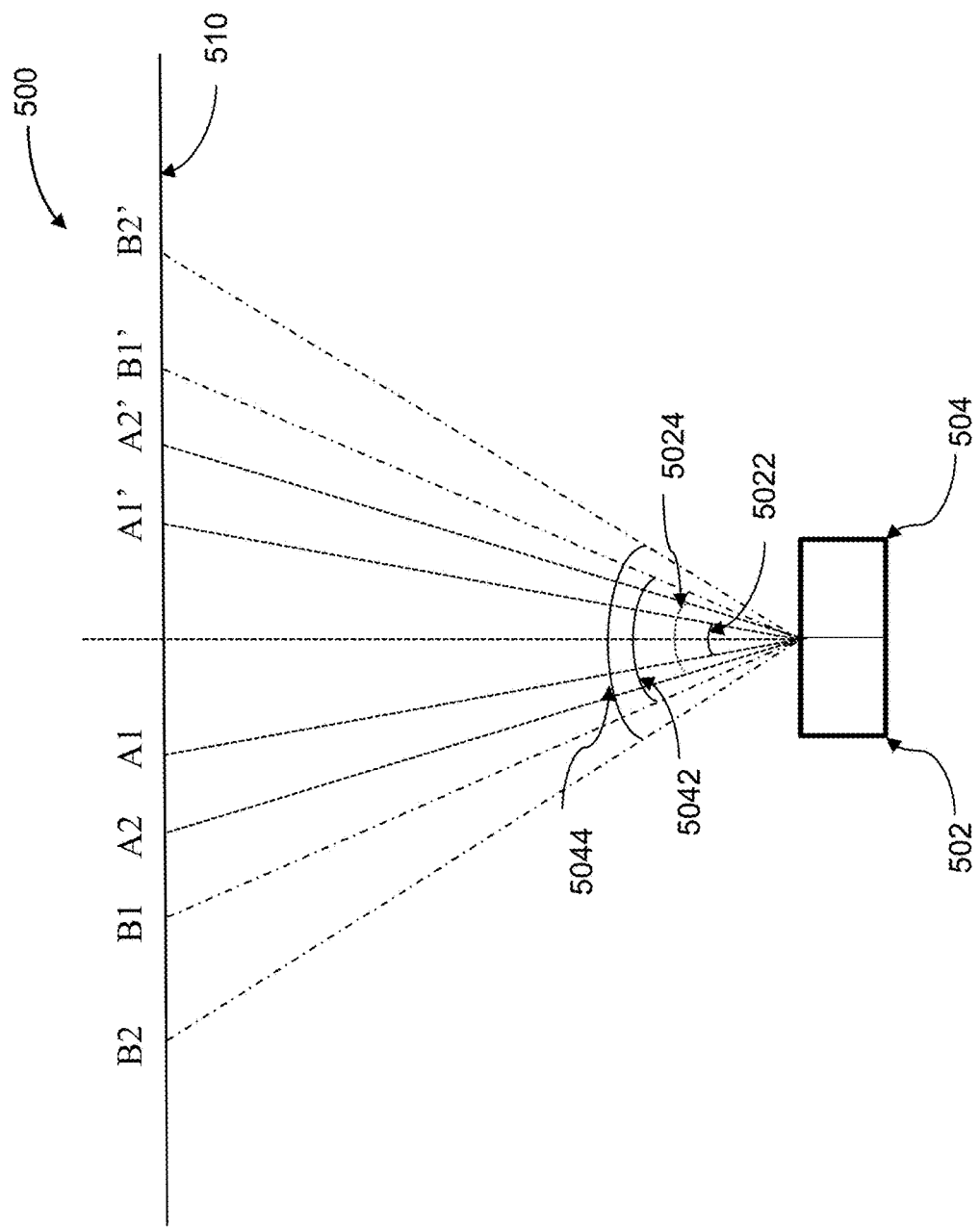
FIG. 5 illustrates the non-overlapping field of view angles of optical modules in an imaging system, in accordance with some embodiments of the disclosure.

FIG. 5 illustrates the non-overlapping field of view angles of optical modules in an imaging system, in accordance with some embodiments of the present disclosure. In the illustration of FIG. 5, the first optical module 502 and the second optical module 504 may be juxtaposed and aligned to capture images from the same direction. The optical axes of the first optical module 502 and the second optical module 504 may be parallel. A distance between the first optical module 502 and the second optical module 504 may be small as compared to a distance to the object 510, thus may be omitted for the ease of calculation.

In the embodiments shown in FIG. 5, the first FOV range of the first optical module 502 may encompass a wider FOV angle than the second FOV range of the second optical module 504. The first optical module 502 may have a first FOV ranging from angle 5022 to angle 5024. The image captured by the first optical module 502 at a minimal FOV of angle 5022 may cover a portion A1-A1' of the object 510, and the image captured by the first optical module 502 at a maximum FOV of angle 5024 may cover a larger portion A2-A2' of the object 510. Therefore, the image captured by the first optical module 502 may "view" the object 510 with a minimal portion A1-A1' and a maximum portion A2-A2'. Likewise, the image captured by the second optical module 504 at a minimal FOV of angle 5042 may cover a portion B1-B1' of the object 510, and the image captured by the second optical module 504 at a maximum FOV of angle 5044 may cover a larger portion B2-B2' of the object 510. Therefore, the image captured by the second optical module 504 may "view" the object 510 with a minimal portion B1-B1' and a maximum portion B2-B2'. In some embodiments, the size of first image sensor in the first optical module 502 and the size of second image sensor in the second optical module 504 may be the same. Consequently, according to the equation as discussed with reference to FIG. 2, the second optical module 504 having a narrower FOV may have larger focal length than the first optical module 502 having a wider FOV; therefore, the images captured by the second optical module 504 may have a larger zoom ratio than the first optical module 5020, which means that the images captured by the second optical module 504 may show more details of the object 510.

In the embodiments shown in FIG. 5, the first FOV range of the first optical module 502 and the second FOV range of the second optical module 504 may not overlap. In case the size of first image sensor in the first optical module 502 and the size of second image sensor in the second optical module 504 are the same, the non-overlapping FOV ranges may mean that a focal length range of the first optical module 502 and a focal length range of the second optical module 504 do not overlap. For instance, the first optical module 502 may have a FOV angle range from 94.5° to 23.3°, which corresponds to a focal length range from 20 mm to 105 mm, and the second optical module 504 may have a FOV angle range from 12.4° to 6.19°, which corresponds to a focal length range from 200 mm to 600 mm. For image sensors having the same size, the second optical module 504 having a narrower FOV angle range, that is, having larger focal length range, may have a larger zoom ratio of the image.

In some embodiments, the first image and the second image, which are captured by the first optical module 502 having a wider FOV and the second optical module 504 having a narrower FOV respectively, may be displayed on a display device such that a second image captured by the second optical module 504 is displayed within the first image captured by the first optical module 502. A size, position and pattern of displaying the second image within the first image may be predetermined. In some instances, the second image may be displayed on a corner of the first image, a center of the first image, or a predetermined position of the first image, based on a predetermined display pattern. Alternatively, the second image may be centered on a point selected by a user within the first image.

In some embodiments, only one of the first image and the second image, which are captured by the first optical module 502 having a wider FOV and the second optical module 504 having a narrower FOV respectively, may be displayed on a display device. In some instances, the FOV angular range of the first optical module 502 and the FOV angular range of the second optical module 504 may not overlap. In this case, a displaying of the first image captured by the first optical module 502 may be switched to a displaying of the second image captured by the second optical module 504 by interpolation algorithm. In some embodiments, the interpolation algorithm may be cubic interpolation. Alternatively, the interpolation algorithm may be bilinear interpolation. By means of the interpolation algorithm, the missing image in the non-overlapping FOV range may be calculated; therefore, a user may feel like a continuous zooming effect when a displaying of the first image is transited to a displaying of the second image.

Figure 6:
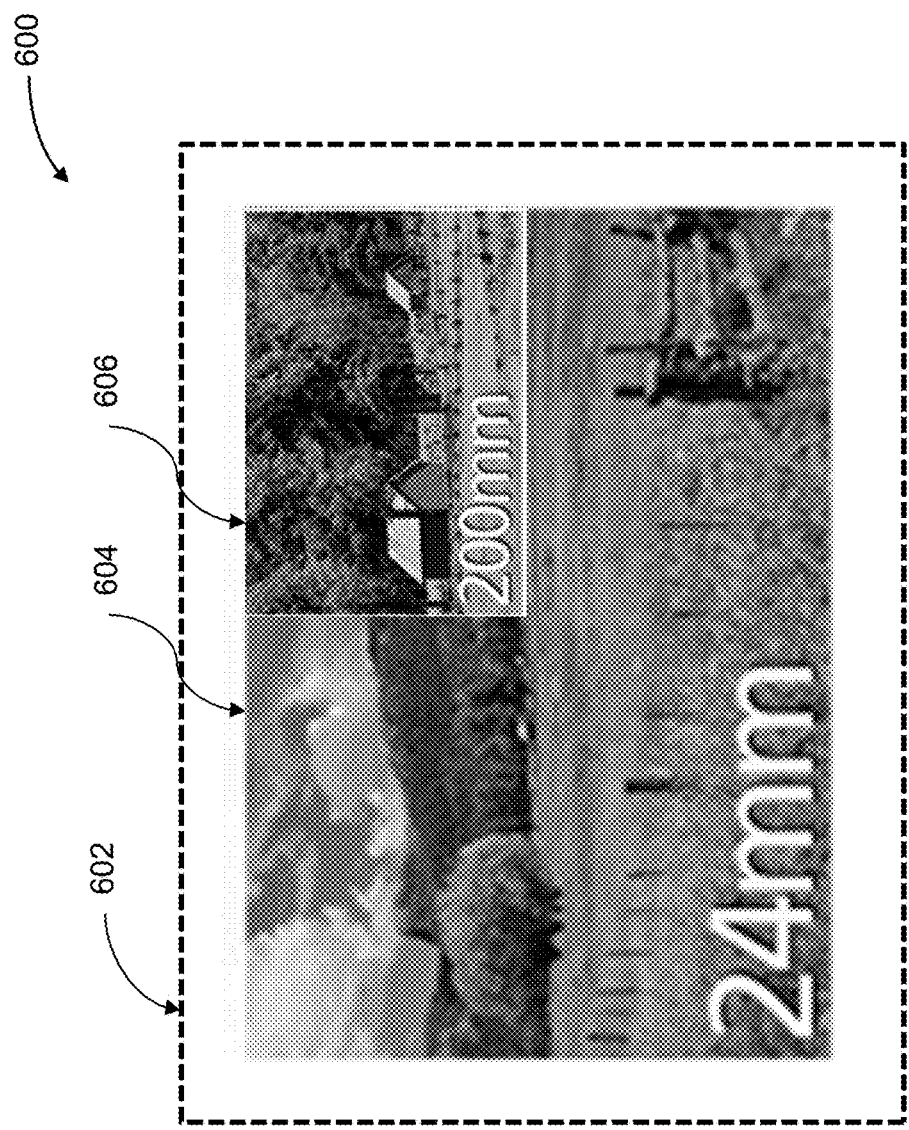
FIG. 6 illustrates two images shown on a display device, in accordance with some embodiments of the present disclosure.

FIG. 6 illustrates the two images shown on the display device, in accordance with some embodiments of the present disclosure. Within a display device 602, both the first image 604, which is captured by the first optical module having a wider FOV, and the second image 606, which is captured by the second optical module having a narrower FOV, may be displayed. The FOV range of the first optical module may overlap the FOV range of the second optical module. For instance, the FOV range of the first optical module and the FOV range of the second optical module may be centered on a same point and have an overlapped range. Optionally, the FOV range of the first optical module and the FOV range of the second optical module may not be centered on a same point and have an overlapped range. Alternatively, The FOV range of the first optical module may not overlap the FOV range of the second optical module. For instance, the FOV range of the first optical module and the FOV range of the second optical module may be centered on a same point and have no overlapped range. Optionally, the FOV range of the first optical module and the FOV range of the second optical module may not be centered on a same point and have no overlapped range. The display device 602 may be a display onboard the movable object or stationary object carrying the imaging system. Optionally, the display device 602 may be a display which is remote to the imaging system, as discussed hereinabove.

In some embodiments, the second image 606 may be displayed within the first image 604. In some embodiments, a size, position and pattern of displaying the second image 606 within the first image 604 may be predetermined. For instance, the second image may be displayed within the first image by occupying a 50% area of the first image. Optionally, the second image may be displayed within the first image by occupying a 40%, 30%, 20% or 10% area of the first image. Alternatively, the first and second images may be displayed on a display device in a side to side pattern. For instance, the first image may occupy a 50% area of the display device and the second image may occupy another 50% area of the display device. Optionally, the first image may occupy a 60% area of the display device and the second image may occupy the remaining 60% area of the display device. Still optionally, the first image may occupy a 70% area of the display device and the second image may occupy the remaining 30% area of the display device. Alternatively, a size, position and pattern of displaying the second image 606 within the first image 604 may be adjusted by the user, for example by dragging and zooming the second image 606 within the first image 604. Alternatively, the first image 604 which is captured by the first optical module having a wider FOV may be displayed within the second image 606 which is captured by the second optical module having a narrower FOV. Optionally, the positional relation of the first and second images may be changed upon user's command.

In some embodiments, the second image 606 may be centered on a point selected by a user within the first image 604. For example, the user may firstly view the first image 604, which is captured by the first optical module having a wider FOV and thus has a wide view, and then select a point of interest on the first image by touching the first image 604. A second image 606 centered on the point of interest selected by the user, which is captured by the second optical module having a narrower FOV and thus has an enlarged view, may be displayed within the first image 604. Alternatively, the position and size of displaying the second image may be moved and changed by the user.

In some embodiments, the first and/or second images to be displayed may be a subset or a portion of the images captured by the first and/or second optical modules. The subset or portion of the first and/or second images to be displayed may be selected by a user. In some embodiments, the user may enlarge (zoom in) and/or reduce (zoom out) the displayed first and/or second images. For instance, the user may enlarge (zoom in) and/or reduce (zoom out) the first and/or second images by operating one or more buttons provided on the display device 602, if the user wishes to view a larger view or a wider view. Optionally, the user may enlarge (zoom in) and/or reduce (zoom out) the first and/or second images by touching one or more soft buttons displayed on the display device 602. The user may select a portion of the first and/or second images to be displayed.

In some embodiments, the second image captured by the second optical module having a narrower field of view may be displayed within a third image which is obtained by combining the second image and the first image captured by the first optical module having a wider field of view. In some instances, the third image may be obtained by combining the second image and first image using an interpolation algorithm. The interpolation algorithm may be a cubic interpolation or a bilinear interpolation. For instance, a user may want to view the second image within an image which is captured by an optical module having a FOV out of the FOV ranges of the first optical module and the second optical module. The third image may not be directly captured by either the first optical module or second optical module, but can be obtained by combining the second image and the first image.

Figure 7:
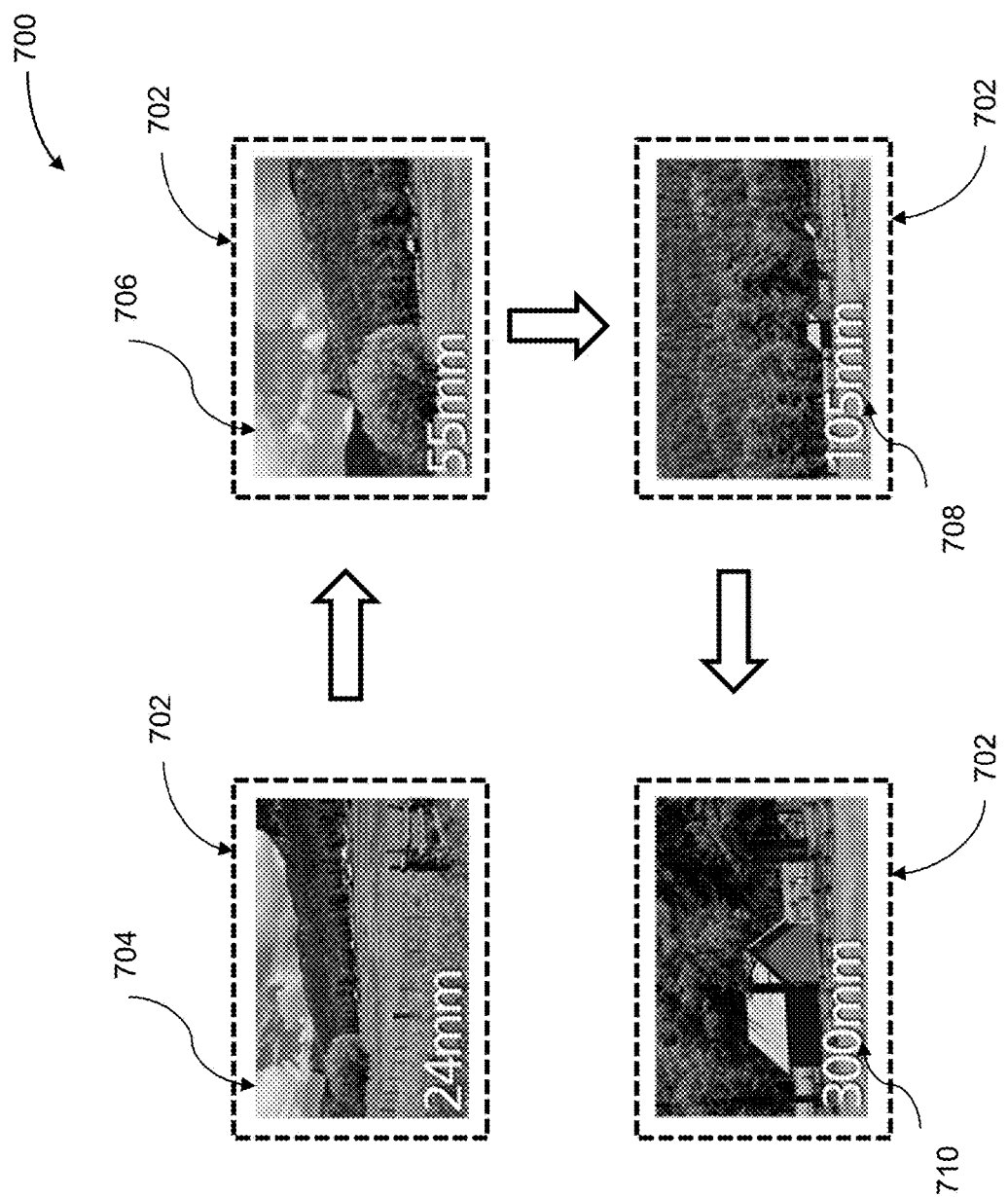
FIG. 7 illustrates one image shown on a display device, in accordance with some embodiments of the present disclosure.

FIG. 7 illustrates a single image shown on the display device, in accordance with some embodiments of the present disclosure. Within a display device 702, only one of the first image 604 and the second image 606, which are captured by the first optical module having a wider FOV and the second optical module having a narrower FOV respectively, may be displayed in some instances. In the embodiments shown in FIG. 7, one image may be displayed from a wider FOV (i.e. shorter focal length) to a narrower FOV (i.e., larger focal length), for example, from image 704 having a wider view, to image 710 having a larger view.

In some embodiments, a sequence of displaying the first image, which is captured by the first optical module having a wider FOV and thus has a wide view, and the second image, which is captured by the second optical module having a narrower FOV and thus has an enlarged view, may be predetermined. Alternatively, the sequence of displaying the first image and the second image may be selected by the user. For example, according to a system default setting, the first image 704 having a wide view may be firstly displayed on the display device 702. Optionally, the user may change the displaying to the second image having an enlarged view by operating one or more buttons provided on the display device 702 or by touching one or more soft buttons displayed on the display device 702.

In some embodiments, the first and/or second images to be displayed may be a subset or a portion of the images captured by the first and/or second optical modules. The subset or portion of the first and/or second images to be displayed may be selected by a user. In some embodiments, the user may enlarge (zoom in) or reduce (zoom out) the displayed first or second images. For instance, the user may enlarge (zoom in) or reduce (zoom out) the first or second images by operating one or more buttons provided on the display device 702, if the user wishes to view a larger view or a wider view. Optionally, the user may enlarge (zoom in) or reduce (zoom out) the first or second images by touching one or more soft buttons displayed on the display device 702. The user may select a portion of the first image or the second image to be displayed.

In some embodiments, the FOV angular range of the first optical module may overlap the FOV angular range of the second optical module. For instance, the first optical module may have a FOV angle range from 94.5° to 12.4°, which corresponds to a focal length range from 20 mm to 200 mm, and the second optical module may have a FOV angle range from 23.3° to 6.19°, which corresponds to a focal length range from 105 mm to 600 mm. In this example, the FOV range of the first optical module and the FOV range of the second optical module may overlap from 23.3° to 12.4°, which corresponds to an overlapping in the focal length ranges from 105 mm to 200 mm. In some embodiments, the first image 704, which is captured by the first optical module having a wider FOV and thus has a wide view, may be displayed initially on the display device 702. The user may then sequentially view larger image, such as images 706, 708 and 710, by operations such as pressing buttons provided on the display device 702, touching soft keys displayed on the display device 702, or gliding on a multi-touch screen of the display device 702.

In the overlapping FOV range of the first and second optical modules, a displaying of the first image captured by the first optical module may be switched to a displaying of the second image captured by the second optical module by a soft switching. In some instances, in the overlapped FOV range from 23.3° to 12.4° of the embodiments as discussed hereinabove, the image data from both the first optical module and the second optical module may be processed by way of weighting to generate the image data to be displayed on the display device. By means of the soft switching, the user may not notice the transition from displaying the first image to the second image. The user may experience a wide and continuous FOV range from 94.5° to 6.19° (which corresponds to a focal length range from 20 mm to 600 mm) from the imaging system which comprises a first optical module with a FOV angle range from 94.5° to 12.4° and a second optical module with a FOV angle range from 23.3° to 6.19°.

Alternatively, the FOV angular range of the first optical module may not overlap the FOV angular range of the second optical module. For instance, the first optical module may have a FOV angle range from 94.5° to 23.3°, which corresponds to a focal length range from 20 mm to 105 mm, and the second optical module may have a FOV angle range from 12.4° to 6.19°, which corresponds to a focal length range from 200 mm to 600 mm. The FOV angular ranges of the first and second optical modules may not overlap over the range from 23.3° to 12.4°, which corresponds to a focal length range from 105 mm to 200 mm.

In the non-overlapping FOV range of the first and second optical modules, a displaying of the first image captured by the first optical module may be switched to a displaying of the second image captured by the second optical module by an interpolation algorithm. In some embodiments, the interpolation algorithm may be cubic interpolation. Alternatively, the interpolation algorithm may be bilinear interpolation. By means of the interpolation algorithm, the missing image in the non-overlapping FOV range may be calculated and displayed; therefore, thus the user may not notice the transition from displaying the first image to the second image. The user may experience a wide and continuous FOV range from 94.5° to 6.19° (which corresponds to a focal length range from 20 mm to 600 mm) from the imaging system which comprises a first optical module with a FOV angle range from 94.5° to 23.3° and a second optical module with a FOV angle range from 12.4° to 6.19°.

By way of the configuration of present disclosure, the user may experience a continuous zooming effect when a displaying of the first image is transited to a displaying of the second image. With the imaging system having a plurality of optical modules of present disclosure, while zooming in and zooming out, a set of continuous images may be captured to the same scene but the optical module, which is capturing the current image, may be switched, depending on the FOV range or focal length range. For instance, a first optical module may be initially used to capture images of a scene, but then as zooming in, a maximum FOV or focal length of the first module may be reached, and the imaging system may switch over to the second optical module, and then may switch to a third optical module. The gravity center of the imaging system may not significantly change, which contributes to a stable operation of a movable object or a stationary object carrying the imaging system.

Figure 2:
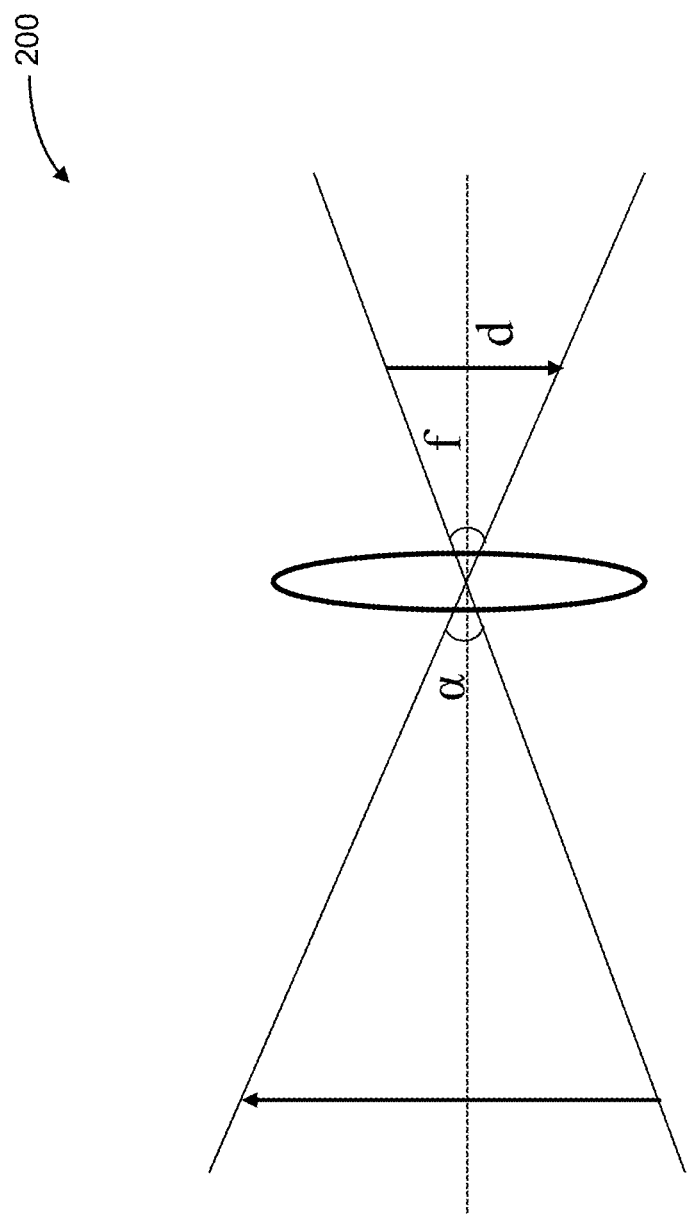
FIG. 2 shows an illustration of a field of view angle of an optical lens, in accordance with some embodiments of the disclosure.

As discussed with reference to FIG. 2 hereinabove, the FOV of an optical module may be determined by a focal length of the lens and a size of the image sensor of the optical module. The imaging systems as discussed hereinabove may also be implemented by comprising two optical modules having different focal length ranges. The focal length ranges of the two optical modules may be selected or designed such that the FOV ranges of the two optical modules may overlap or may not overlap, to produce the same effect such as a wide and continuous FOV range, a continuous zooming and a stable operation. Therefore, all the discussion with regard to a FOV angular range of the optical module in the above discussed embodiments may be equivalently applied to a focal length range of the optical module.

Figure 8:
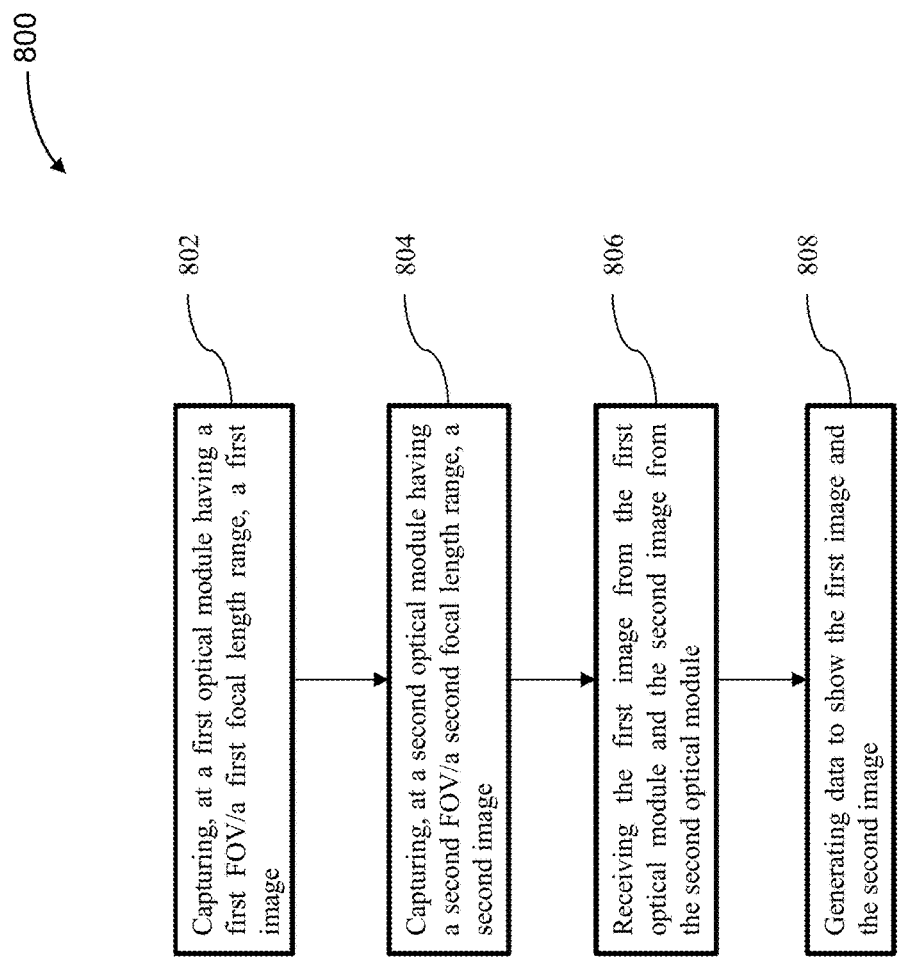
FIG. 8 is a flow chart illustrating a method of displaying multiple images in accordance with embodiments of the disclosure.

FIG. 8 is a flow chart illustrating a method of displaying multiple images in accordance with embodiments of the disclosure. In step 802, a first image may be captured at a first optical module comprising a first image sensor. The first optical module may have a first field of view angular range. As discussed with reference to FIG. 2 hereinabove, the FOV of an optical module may be determined by a focal length of the lens and a size of the image sensor of the optical module. Therefore, the method 800 of the embodiment may also be implemented by comprising two optical modules having different focal length ranges.

In step 804, a second image may be captured at a second optical module comprising a second image sensor. In some embodiments, the second optical module may have a second field of view angular range which is different from the first field of view angular range. In some embodiments, at least one of the first and second optical modules may be a zoom lens. Alternatively, at least one of the first and second optical modules may be a prime lens. In some embodiments, the first FOV angular range or first focal length range of the first optical module may overlap the second FOV angular range or second focal length range of the second optical module. Alternatively, the first FOV angular range or first focal length range of the first optical module may not overlap the second FOV angular range or second focal length range of the second optical module.

In some embodiments, the first optical module and second optical module may be juxtaposed and aligned to capture images from the same direction. In some embodiments, the optical axes of the first optical module and second optical module may be parallel, and a distance between the first optical module and second optical module may be small. In some embodiments, the optical lens of first optical module and optical lens of second optical module may be an optical zoom type or a digital zoom type.

In step 806, image data for the first image may be received from the first optical module, and image data for the second image may be received from the second optical module. In step 808, data to show the first image and the second image captured using the first optical module and the second optical module within a display may be generated.

In some embodiments, one of the first image and the second image captured using the first optical module and the second optical module may be displayed within the display. In some instances, if the first field of view angular range or the focal length range of the first optical module overlap the second field of view angular range overlap or the second focal length range of the second optical module, then a displaying of the first image may be switched to a displaying of the second image by soft switching; if the first field of view angular range or the focal length range of the first optical module does not overlap the second field of view angular range overlap or the second focal length range of the second optical module, then a displaying of the first image may be switched to a displaying of the second image by interpolation algorithm.

Alternatively, both the first image and the second image captured using the first optical module and the second optical module may be displayed within the display. In some instances, the images are displayed such that a second image captured by the second optical module having a narrower FOV or a larger focal length range may be displayed within the first image captured by the first optical module having a wider FOV or a smaller focal length range. In some instances, the second image may be centered on a point selected by a user within the first image.

Figure 9:
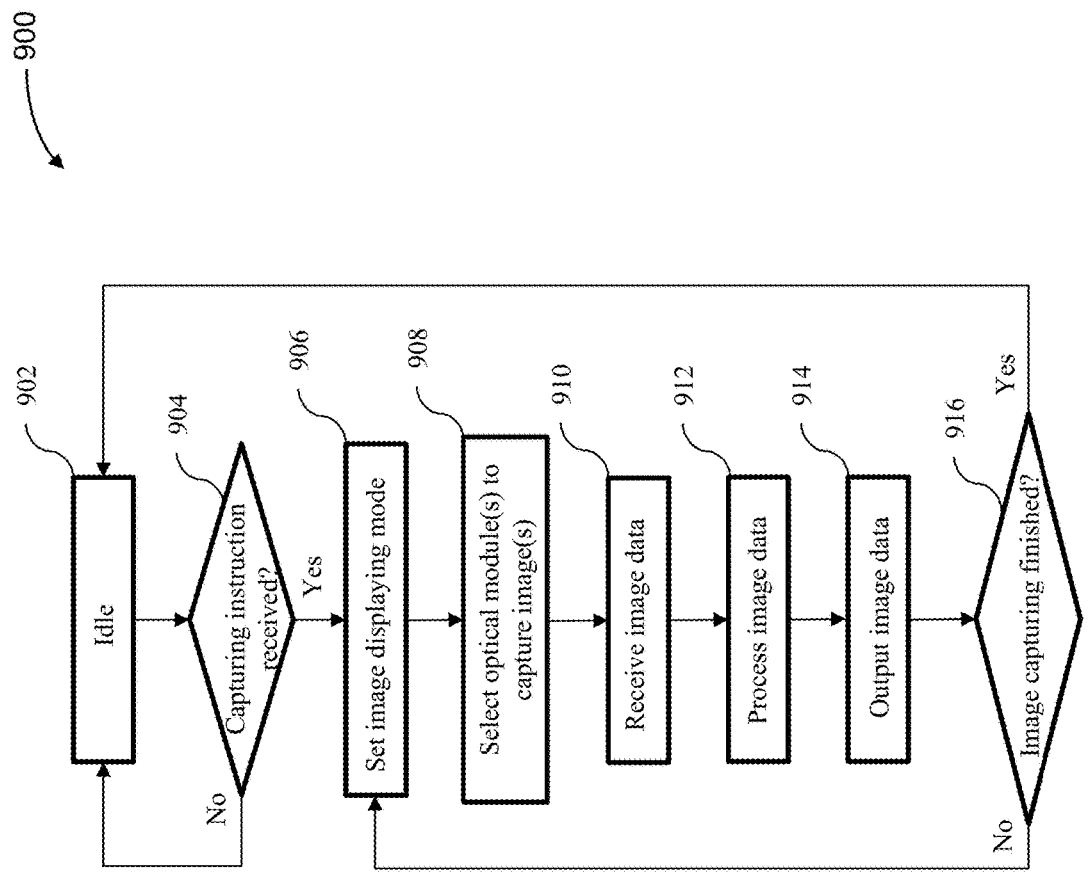
FIG. 9 is a flow chart illustrating a method of displaying multiple images in accordance with embodiments of the disclosure.

FIG. 9 is a flow chart illustrating a method of displaying multiple images in accordance with embodiments of the disclosure.

The method 900 of displaying multiple images may starts from an idle step 902. In step 904, a determination may be made on whether a capturing instruction is received from the user. If the determination in step 904 is that a capturing instruction is not received from the user, then the method may return to step 902. If the determination in step 904 is that a capturing instruction is received from the user, then in step 906, an image displaying mode may be set.

The image displaying mode may comprise at least a single-image displaying mode and a multiple images display mode. In some instances, the image displaying mode may further comprise a wide FOV displaying mode and a narrow FOV displaying mode for the single-image displaying mode. Optionally, the image displaying mode may further comprise a side-by-side displaying mode, an up-and-down displaying mode, a Picture-in-Picture (PIP) displaying mode for the multiple images display mode. In some instances, the image displaying mode may be selected and inputted by operating one or more buttons provided on the imaging system or the display device. Alternatively, the image displaying mode may be selected and inputted by touching one or more soft buttons displayed on the display device.

In some embodiments, the image displaying mode may be set by the user in step 906. Alternatively, the image displaying mode may be selected by the user at step 904 together with the capturing instruction, thus in step 906, the image displaying mode may be set according to the received capturing instruction.

Once the image displaying mode is set, then in step 908, one or more optical modules may be selected to capture images, according to the image displaying mode. In some embodiments, the set image displaying mode may be a single-image displaying mode for displaying one of the first and second images captured by the first and second optical modules. In this case, one of the first and second optical modules may be selected to capture images. In some instances, the set image displaying mode may be a wide FOV displaying mode, and in step 908, one of the first and second optical modules, which has a wider FOV, may be selected to capture images in step 908. Alternatively, the set image displaying mode may be a narrow FOV displaying mode, and in step 908, one of the first and second optical modules, which has a narrower FOV, may be selected to capture images. In other embodiments, the set image displaying mode may be a multiple-image displaying mode for displaying both the first and second images captured by the first and second optical modules. In this case, both the first and second optical modules may be selected to capture images in step 908.

In step 910, image data may be received from the selected one or multiple optical modules. Then in Step 912, the received image data may be processed to generate a processed image data. The image data received from the selected one or multiple optical modules may be processed according to the user set image displaying mode.

In some embodiments, the set image displaying mode may be a single-image displaying mode for displaying one of the first and second images captured by the first and second optical modules. The image data may be received from one of the first and second optical modules in step 910 and the received image date may be processed in step 912. In some instances, the processing on the image data may include selecting and clipping a portion of the image captured by the one of the first and second optical modules, such that only a portion of the image captured by the one of the first and second optical modules may be displayed on a display device.

Alternatively, the set image displaying mode may be a multiple-image displaying mode for displaying both the first and second images captured by the first and second optical modules. The image data may be received from both the first and second optical modules in step 910 and the received image data may be processed in step 912. In some instances, the processing on the image data may include fusing the first and second images captured by the first and second optical modules, such that the second image captured by the second optical module having a narrower FOV is displayed within the first image captured by the first optical module having a wider FOV.

In step 914, the processed image data may be outputted to a display device for user's view. Then, in step 916, a determination may be made on whether the image capturing is finished. If the image capturing is determined as being finished in step 916, then the method may return to idle step 902. If the image capturing is determined as being not finished in step 916, then the method may goes to step 906, which the user may set an image displaying mode again for further displaying.

Figure 10:
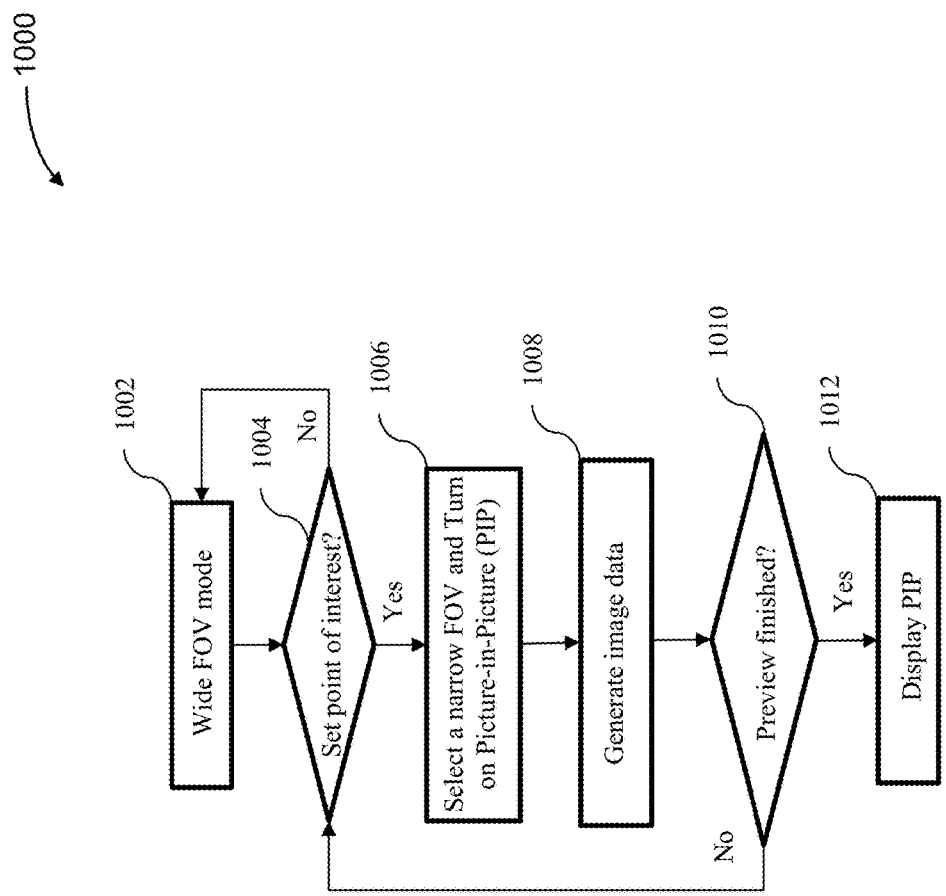
FIG. 10 is a flow chart illustrating a method of implementing a Picture in Picture (PIP) magnifier function in accordance with embodiment of the disclosure.

FIG. 10 is a flow chart illustrating a method of implementing a Picture in Picture (PIP) magnifier function in accordance with embodiment of the disclosure. The method 1000 may implement a Picture in Picture (PIP) magnifier function by using the imaging system of present disclosure. For instance, the user may view an image captured by one of the first and second optical module having a wider FOV, and select a point of interest on the displayed image. Upon user's selecting, another image having larger zoom ratio may be displayed by introducing the other one of the first and second optical module having a narrower FOV.

In step 1002, the image captured by one of the first and second optical module having a wider FOV may be displayed on the display device. Then in step 1004, a determination may be made on whether a point of interest is set by the user. The point of interest may be a point or a portion of the currently displayed image at which the user wishes to view with larger zoom ratio for more details. In some embodiments, the user may select and set a point of interest by operating one or more buttons provided on a display device or the imaging system. Alternatively, the user may select and set a point of interest by touching one or more soft buttons displayed on the display device. In some instances, the user may enlarge or zoom in the currently displayed image by changing the focal length of an optical lens of the optical module during the process of setting a point of interest, if the optical module for capturing the currently displayed image comprises a zoom type lens. Optionally, the user may digitally enlarge or zoom in the currently displayed image during the process of setting a point of interest.

If the determination made in step 1004 is that a point of interest is not set by the user, then the method may return to step 1002 and continue display the image captured by the optical module having a wider FOV. If the determination made in step 1004 is that a point of interest is set by the user, then in step 1006, an optical module having a narrow FOV may be selected and a Picture-in-Picture (PIP) mode may be turned on. In some instances, if only two optical modules are provided in the imaging system of present disclosure, the procedure of selecting an optical module having a narrow FOV in step 1006 may be omitted. Alternatively, if more than two optical modules are provided in the imaging system of present disclosure, an optical module having an appropriate FOV range or optical length range (i.e., an appropriate zoom ratio) may be selected in step 1006.

In step 1008, the first image captured by the first optical module having a wider field of view and the second image captured by the second optical module having a narrower field of view may be processed to generate a processed image data. In some embodiments, the processing may include fusing the first and second images captured by the first and second optical modules such that the second image captured by the second optical module having a narrower FOV is displayed within the first image captured by the first optical module having a wider FOV. In some instances, a position, a size and/or a shape of the second image within the first image may be predetermined. Optionally, a position, a size and a shape of the second image within the first image may be adjusted by the user.

In step 1010, the processed image data generated in step 1008 may be outputted to a display device for user's preview, and a determination may be made on whether the previewed is finished. In some embodiments, the user may preview the first and second images as displayed, and may adjust the position, size and/or shape of the second image within the first image. For instance, the user may adjust the position, size and/or shape of the second image within the first image by dragging the second image on the display device which may be an interactive screen.

If the determination made in step 1010 is that a preview is not finished, then the method may go back to step 1004, in which the point of interest may be selected again. Otherwise, if the determination made in step 1010 is that a preview is finished, then in step 1012, the second image captured by the second optical module having a narrower FOV may be displayed within the first image captured by the first optical module having a wider FOV in a PIP mode. From the second image, the user may observe more details of the scene because the second image is captured by the second optical module having a narrower FOV, which means a larger focal length range and a larger zoom ratio. In some embodiments, the method 1000 may further include an optional step after step 1012, in which the first and second image shown in PIP mode may be swapped, such that the first image captured by the first optical module having a wider FOV may be displayed within the second image captured by the second optical module having a narrower FOV.

In some embodiments, the step 1010 may be optional. For instance, the user may not preview the first and second images, and the processed image data generated in step 1008 may be directly displayed in a PIP mode. In some embodiments, the method 1000 may further include a step after step 1012, in which the PIP display mode may be turned off, and the image having a wider FOV may be solely display. Alternatively, in the step after step 1012, the PIP display mode may be turned off, and the image having a narrower FOV may be solely display.

In some embodiments, at least one of the first and second optical modules may be a zoom lens. Alternatively, at least one of the first and second optical modules may be a prime lens. For example, the first optical module may be a prime lens and the second optical module may be a zoom lens. In this case, a second image which is captured by the second optical module having a varying FOV or length, may be displayed within a first image which is captured by the first optical module having a fixed FOV or focal length. The second image may be centered on a point selected by the user within the first image. Optionally, only one of the first and second images, which are captured by the first and second optical modules, may be displayed.

For another example, both the first and second optical modules may be prime lenses. In this case, a second image having a larger zoom ratio, which is captured by the second optical module having a narrower FOV or a larger focal length, may be displayed within a first image having a smaller zoom ratio, which is captured by the first optical module having a wider FOV or a smaller focal length. The second image may be centered on a point selected by the user within the first image. Optionally, only one of a first image which is captured by the second optical module having a wider FOV or a smaller focal length, and a second image which is captured by a second optical module having a narrower FOV or a larger focal length, may be displayed.

In the embodiments discussed hereinabove, images may be captured and displayed by the imaging system of the present disclosure. However, the imaging system may also be used to capture and display videos. In some embodiments, both or one of a first video captured by a first optical module having a first FOV range or first focal length range, and a second video captured by a second optical module having a second FOV range or second focal length range, may be displayed, as discussed hereinabove. Alternatively, one of the first and second optical modules may capture an image, and the other one of the first and second optical modules may capture a video. Both or only one of the captured image and video may be displayed, in a manner as discussed hereinabove, The number of the optical modules may not necessarily be two. In some embodiments, the imaging system of present disclosure may comprise three or more optical modules which are juxtaposed and aligned to capture images and/or video from the same direction. In this case, arbitrary number of a plurality of images and/or videos captured by a plurality of optical modules may be selectively displayed, in a manner as discussed hereinabove. In some instances, a preview of four images and/or videos captured by four juxtaposed optical modules may be provided. One, two, three or four images and/or videos may be selected by the user and displayed on the display device according to a predetermined pattern or a user customized pattern.

The imaging system having multiple optical modules of present disclosure may be particularly suitable for aerial vehicles such as UAVs.

In some instances, the multiple optical modules may be low weight; therefore, one or more additional optical modules onboard the UAV may not add great load to the UAV or adversely affect the flexibility and lifetime of the UAV. In some instances, the dimension of the multiple optical modules may be small if compared with the traditional optical module such as a zoom type optical module having a set of optical lenses. For instance, in case a traditional optical module having a focal length range from 20 mm to 600 mm (which corresponds to a FOV angle range from 94.5° to 6.19°) is replaced by the imaging system having two optical module of present disclosure, the first optical module may for example have a focal length range from 20 mm to 200 mm (which may corresponds to a FOV angle range from 94.5° to 12.4°), and the second optical module may for example have a focal length range from 105 mm to 600 mm (which may corresponds to a FOV angle range from 23.3° to 6.19°). The dimension of the first and second optical module may be less than the traditional optical module having larger focal length range, since the relative moving distance required for the set of optical lenses may be shortened due to less focal length range. In some instances, the gravity center of the UAV carrying the imaging system of present disclosure may not be significantly changed when the optical modules are zooming in and out, as a result of less moving distance required by the set of optical lenses of respective optical module.

The UAV carrying an imaging system having multiple optical modules of present disclosure may facilitate a user in image and/or video viewing. In some instances, the user may view the image and/or video of a scene captured by the UAV through a first optical module having a moderate focal length or focal length range. If the user has particular interest on a portion of the scene as displayed, the user can view an enlarged view of the interested point or portion of scene through a second optical module having a larger focal length or focal length range. A plurality of optical modules may be provided on the UAV, such that the user can view greater details of the scene by switching to a further optical module having even larger focal length or focal length range. The user may not notice a transition from the image and or video captured by the first optical module to the image and or video captured by the second or even third or further optical module, due to merits of the weighting process or interpolation algorithm as discussed hereinabove. Meanwhile, the gravity center of the UAV may not be significantly changed when the optical modules are zooming in and out, since the moving distance required by the set of optical lenses of respective optical module are relatively small.

The UAV carrying an imaging system having multiple optical modules of present disclosure may provide more interactive operation with the user. In some instances, the user may view the image and/or video captured by the UAV flying around, and select a point or a portion of interest on the displayed image and/or video. The selection of the point or portion of interest may be implemented by operating buttons provided on the display device or on the UAV. Alternatively, the selection of the point of interest may be implemented by touching soft buttons displayed on a screen of the remote terminal. Optionally, the selection of the portion of interest may be implemented by touching a screen of the remote terminal by multiple fingers of the user. The user may select a desired zoom ratio, FOV and/or focal length of the point or portion of interest to be further displayed on the initial image. Optionally, the user may select a position, a size, a shape and/or a pattern of the point or portion of interest to be further displayed on the initial image.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
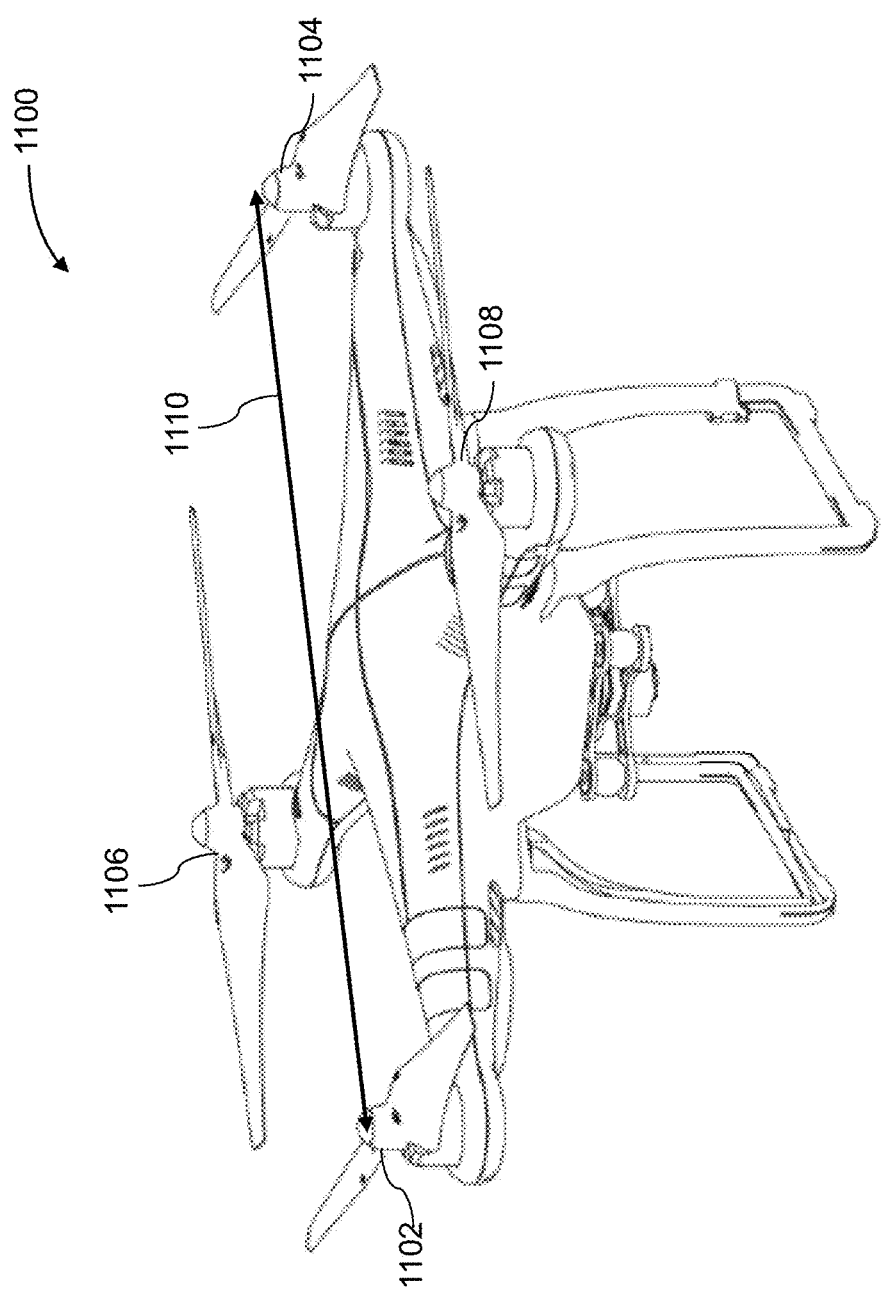
FIG. 11 illustrates an appearance of UAV in accordance with embodiments of the present disclosure.

FIG. 11 illustrates an unmanned aerial vehicle (UAV) 1100, in accordance with embodiments of the present disclosure. The UAV may be an example of a movable object as described herein, to which the method and apparatus of discharging a battery assembly may be applied. The UAV 1100 can include a propulsion system having four rotors 1102, 1104, 1106, and 1108. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 2 m, or less than equal to 5 m. In some embodiments, the length 1110 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 12:
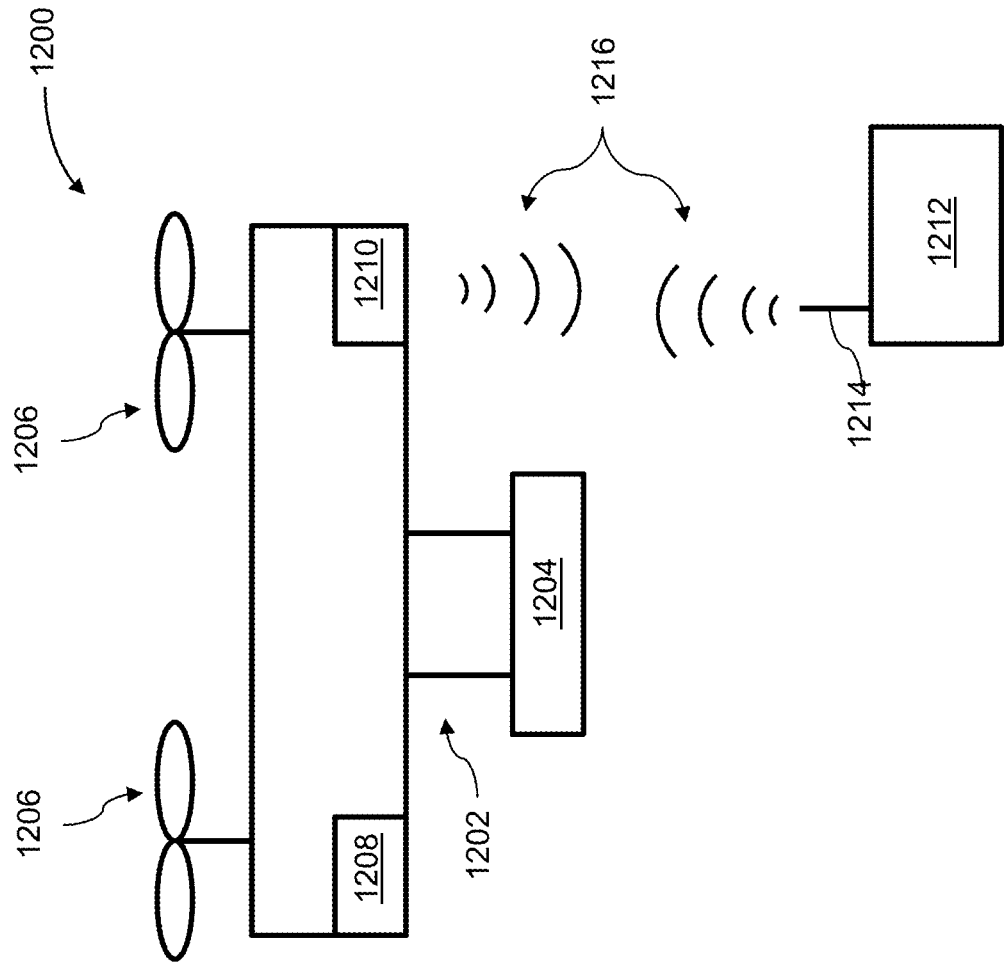
FIG. 12 illustrates a movable object including a carrier and a payload, in accordance with embodiments of the present disclosure.

FIG. 12 illustrates a movable object 1200 including a carrier 1202 and a payload 1204, in accordance with embodiments of the present disclosure. Although the movable object 1200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1204 may be provided on the movable object 1200 without requiring the carrier 1202. The movable object 1200 may include propulsion mechanisms 1206, a sensing system 1208, and a communication system 1210.

The propulsion mechanisms 1206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1206 can be mounted on the movable object 1200 using any suitable means, such as a support element (e.g., a drive shaft) as described elsewhere herein. The propulsion mechanisms 1206 can be mounted on any suitable portion of the movable object 1200, such on the top, bottom, front, back, sides, or suitable combinations thereof.

In some embodiments, the propulsion mechanisms 1206 can enable the movable object 1200 to take off vertically from a surface or land vertically on a surface without requiring any horizontal movement of the movable object 1200 (e.g., without traveling down a runway). Optionally, the propulsion mechanisms 1206 can be operable to permit the movable object 1200 to hover in the air at a specified position and/or orientation. One or more of the propulsion mechanisms 1200 may be controlled independently of the other propulsion mechanisms. Alternatively, the propulsion mechanisms 1200 can be configured to be controlled simultaneously. For example, the movable object 1200 can have multiple horizontally oriented rotors that can provide lift and/or thrust to the movable object. The multiple horizontally oriented rotors can be actuated to provide vertical takeoff, vertical landing, and hovering capabilities to the movable object 1200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 1208 can include one or more sensors that may sense the spatial disposition, velocity, and/or acceleration of the movable object 1200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1208 can be used to control the spatial disposition, velocity, and/or orientation of the movable object 1200 (e.g., using a suitable processing unit and/or control module, as described below). Alternatively, the sensing system 1208 can be used to provide data regarding the environment surrounding the movable object, such as weather conditions, proximity to potential obstacles, location of geographical features, location of manmade structures, and the like.

The communication system 1210 enables communication with terminal 1212 having a communication system 1214 via wireless signals 1216. The communication systems 1210, 1214 may include any number of transmitters, receivers, and/or transceivers suitable for wireless communication. The communication may be one-way communication, such that data can be transmitted in only one direction. For example, one-way communication may involve only the movable object 1200 transmitting data to the terminal 1212, or vice-versa. The data may be transmitted from one or more transmitters of the communication system 1210 to one or more receivers of the communication system 1212, or vice-versa. Alternatively, the communication may be two-way communication, such that data can be transmitted in both directions between the movable object 1200 and the terminal 1212. The two-way communication can involve transmitting data from one or more transmitters of the communication system 1210 to one or more receivers of the communication system 1214, and vice-versa.

In some embodiments, the terminal 1212 can provide control data to one or more of the movable object 1200, carrier 1202, and payload 1204 and receive information from one or more of the movable object 1200, carrier 1202, and payload 1204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1206), or a movement of the payload with respect to the movable object (e.g., via control of the carrier 1202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1208 or of the payload 1204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1212 can be configured to control a state of one or more of the movable object 1200, carrier 1202, or payload 1204. Alternatively or in combination, the carrier 1202 and payload 1204 can also each include a communication module configured to communicate with terminal 1212, such that the terminal can communicate with and control each of the movable object 1200, carrier 1202, and payload 1204 independently.

In some embodiments, the movable object 1200 can be configured to communicate with another remote device in addition to the terminal 1212, or instead of the terminal 1212. The terminal 1212 may also be configured to communicate with another remote device as well as the movable object 1200. For example, the movable object 1200 and/or terminal 1212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1200, receive data from the movable object 1200, transmit data to the terminal 1212, and/or receive data from the terminal 1212. Optionally, the remote device can be connected to the Internet or other telecommunications network, such that data received from the movable object 1200 and/or terminal 1212 can be uploaded to a website or server.

Figure 13:
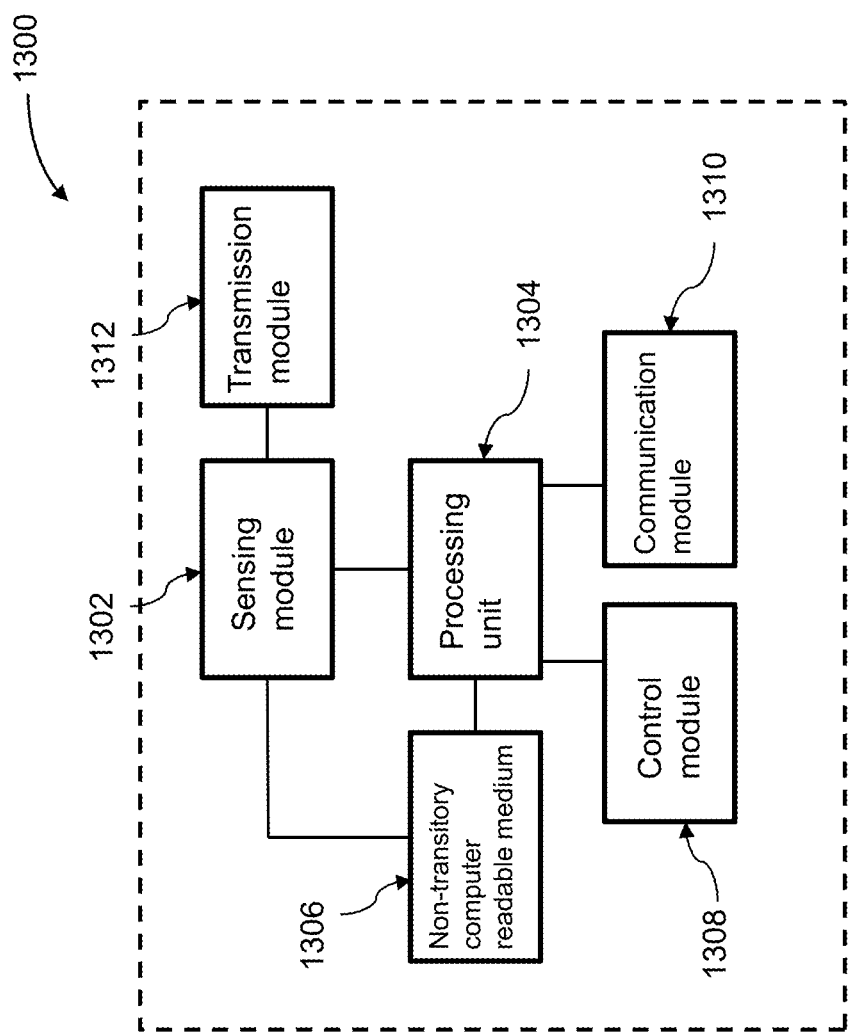
FIG. 13 is a schematic illustration by way of block diagram of a system for controlling a movable object, in accordance with embodiments of the present disclosure.

FIG. 13 is a schematic illustration by way of block diagram of a system 1300 for controlling a movable object, in accordance with embodiments of the present disclosure. The system 1300 can be used in combination with any suitable embodiment of the systems, devices, and methods disclosed herein. The system 1300 can include a sensing module 1302, processing unit 1304, non-transitory computer readable medium 1306, control module 1308, and communication module 1310.

The sensing module 1302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1302 can be operatively coupled to a processing unit 1304 having a plurality of processors. In some embodiments, the sensing module can be operatively coupled to a transmission module 1312 (e.g., a Wi-Fi image transmission module) configured to directly transmit sensing data to a suitable external device or system. For example, the transmission module 1312 can be used to transmit images captured by a camera of the sensing module 1302 to a remote terminal.

The processing unit 1304 can have one or more processors, such as a programmable processor (e.g., a central processing unit (CPU)). The processing unit 1304 can be operatively coupled to a non-transitory computer readable medium 1306. The non-transitory computer readable medium 1306 can store logic, code, and/or program instructions executable by the processing unit 1304 for performing one or more steps. The non-transitory computer readable medium can include one or more memory units (e.g., removable media or external storage such as an SD card or random access memory (RAM)). In some embodiments, data from the sensing module 1302 can be directly conveyed to and stored within the memory units of the non-transitory computer readable medium 1306. The memory units of the non-transitory computer readable medium 1306 can store logic, code and/or program instructions executable by the processing unit 1304 to perform any suitable embodiment of the methods described herein. For example, the processing unit 1304 can be configured to execute instructions causing one or more processors of the processing unit 1304 to analyze sensing data produced by the sensing module. The memory units can store sensing data from the sensing module to be processed by the processing unit 1304. In some embodiments, the memory units of the non-transitory computer readable medium 1306 can be used to store the processing results produced by the processing unit 1304.

In some embodiments, the processing unit 1304 can be operatively coupled to a control module 908 configured to control a state of the movable object. For example, the control module 908 can be configured to control the propulsion mechanisms of the movable object to adjust the spatial disposition, velocity, and/or acceleration of the movable object with respect to six degrees of freedom. Alternatively or in combination, the control module 1308 can control one or more of a state of a carrier, payload, or sensing module.

The processing unit 1304 can be operatively coupled to a communication module 1310 configured to transmit and/or receive data from one or more external devices (e.g., a terminal, display device, or other remote controller). Any suitable means of communication can be used, such as wired communication or wireless communication. For example, the communication module 1310 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1310 can transmit and/or receive one or more of sensing data from the sensing module 1302, processing results produced by the processing unit 1304, predetermined control data, user commands from a terminal or remote controller, and the like.

The components of the system 1300 can be arranged in any suitable configuration. For example, one or more of the components of the system 1300 can be located on the movable object, carrier, payload, terminal, sensing system, or an additional external device in communication with one or more of the above. Additionally, although FIG. 13 depicts a single processing unit 1304 and a single non-transitory computer readable medium 1306, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 900 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. An imaging system comprising:
a first optical module comprising a first image sensor, said first optical module having a first focal length range;
a second optical module comprising a second image sensor, said second optical module having a second focal length range, wherein the first focal length range and the second focal length range are different; and
an image processor configured to receive image data for a first image from the first optical module and/or image data for a second image from the second optical module and generate data to show the first image and/or the second image within a display, wherein:
in response to a user selecting a point within the first image, the second optical module and/or a carrier carrying the first optical module and the second optical module has a rotation corresponding to the point selected by the user, and the second image that is generated through the image data from the second optical module based on the rotation is centered on the point.

2. The imaging system of claim 1, wherein the second focal length range encompasses a larger focal length range than the first focal length range.

3. The imaging system of claim 1, wherein the second image captured by the second optical module having a larger focal length range is displayed within the first image captured by the first optical module having a smaller focal length range.

4. The imaging system of claim 1, wherein one of the first image captured by the first optical module having a smaller focal length range and the second image captured by the second optical module having a larger focal length range is displayed on the display.

5. The imaging system of claim 1, wherein the first focal length range and the second focal length range overlap, and a displaying of the first image is switched to a displaying of the second image by soft switching.

6. The imaging system of claim 1, wherein the first focal length range and the second focal length range do not overlap, and a displaying of the first image is switched to a displaying of the second image by an interpolation algorithm.

7. The imaging system of claim 1, wherein the image processor is configured to generate data to show both the first image and the second image within the display.

8. A method of displaying multiple images, said method comprising:
capturing, at a first optical module comprising a first image sensor, a first image, wherein said first optical module has a first focal length range;
capturing, at a second optical module comprising a second image sensor, a second image, wherein said second optical module has a second focal length range, and wherein the first focal length range and the second focal length range are different;
receiving image data for the first image from the first optical module and/or image data for the second image from the second optical module;
generating data to show the first image and/or the second image within a display; and
in response to a user selecting a point within the first image, controlling the second optical module and/or a carrier carrying the first optical module and the second optical module to have a rotation corresponding to the point selected by the user, and configuring the second image that is generated through the image data from the second optical module based on the rotation to center on the point.

9. The method of claim 8, wherein the second focal length range encompasses a larger focal length range than the first focal length range.

10. The method of claim 8, wherein the second image captured by the second optical module having a larger focal length range is displayed within the first image captured by the first optical module having a smaller focal length range.

11. The method of claim 8, wherein one of the first image captured by the first optical module having a smaller focal length range and the second image captured by the second optical module having a larger focal length range is displayed on the display.

12. The method of claim 8,
wherein the first focal length range and the second focal length range overlap;
the method further comprising:
switching a displaying of the first image to a displaying of the second image by soft switching.

13. The method of claim 8,
wherein the first focal length range and the second focal length range do not overlap;
the method further comprising:
switching a displaying of the first image to a displaying of the second image by an interpolation algorithm.

14. The method of claim 8, wherein generating the data to show the first image and/or the second image within the display includes generating data to show both the first image and the second image within the display.

15. An unmanned aerial vehicle (UAV) comprising:
one or more propulsion units configured to effect flight of the UAV;
a first optical module comprising a first image sensor, said first optical module having a first focal length range;
a second optical module comprising a second image sensor, said second optical module having a second focal length range, wherein the first focal length range and the second focal length range are different; and
an image processor configured to receive image data for the first image from the first optical module and/or image data for the second image from the second optical module and generate data to display the first image and/or the second image captured using the first optical module and/or the second optical module, wherein:
the first optical module and/or the second optical module are movable relative to the one or more propulsion units of the UAV; and
in response to a user selecting a point within the first image, the second optical module and/or a carrier carrying the first optical module and the second optical module has a rotation corresponding to the point selected by the user, and the second image that is generated through the image data from the second optical module based on the rotation is centered on the point.

16. The UAV of claim 15, wherein the image processor is configured to generate data to show one of the first image and the second image within the display.

* * * * *